United States Patent
Yousefpor et al.

(10) Patent No.: US 10,198,610 B1
(45) Date of Patent: Feb. 5, 2019

(54) ACOUSTIC PULSE CODING FOR IMAGING OF INPUT SURFACES

(71) Applicant: Apple Inc., Cupertino, CA (US)

(72) Inventors: Marduke Yousefpor, Cupertino, CA (US); Mohammad Yeke Yazdandoost, Cupertino, CA (US); Brian Michael King, Cupertino, CA (US); Marcus Yip, Cupertino, CA (US); Ehsan Khajeh, Cupertino, CA (US); Aaron Tucker, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 15/275,010

(22) Filed: Sep. 23, 2016

Related U.S. Application Data

(60) Provisional application No. 62/234,283, filed on Sep. 29, 2015, provisional application No. 62/234,492, filed on Sep. 29, 2015, provisional application No. 62/289,797, filed on Feb. 1, 2016, provisional application No. 62/316,091, filed on Mar. 31, 2016.

(51) Int. Cl.
*G06K 9/00* (2006.01)
*H04R 17/00* (2006.01)

(52) U.S. Cl.
CPC ........... *G06K 9/0002* (2013.01); *H04R 17/00* (2013.01)

(58) Field of Classification Search
CPC ............................ G06F 3/0436; G06K 9/0002
See application file for complete search history.

(56) References Cited

U.S. PATENT DOCUMENTS

| | | |
|---|---|---|
| 4,729,128 A | 3/1988 | Grimes |
| 5,162,618 A | 11/1992 | Knowles |
| 5,381,696 A | 1/1995 | Ichinose |
| 5,515,298 A | 5/1996 | Bicz |
| 5,589,636 A | 12/1996 | Bicz |
| 5,719,950 A | 2/1998 | Osten |
| 5,886,452 A | 3/1999 | Toda |

(Continued)

FOREIGN PATENT DOCUMENTS

WO    WO 94/002911    2/1994

OTHER PUBLICATIONS

Bicz et al., "ultrasonic sensor for fingerprints recognition," Proceedings of SPIE 2634, Optoelectgronic and Electronic Sensors, Jun. 30, 1995, doi: 10-1117/12.213142, 9 pages.

(Continued)

*Primary Examiner* — Brian Werner
(74) *Attorney, Agent, or Firm* — Brownstein Hyatt Farber Schreck, LLP

(57) ABSTRACT

An acoustic imaging system includes multiple acoustic transducers disposed to circumscribe a portion of imaging surface. An acoustic imaging system also includes a controller and an image resolver. The acoustic transducers convert electrical signals into mechanical energy and/or mechanical energy into electrical signals. The controller is adapted to apply an electrical signal to the acoustic transducers which, in response, induce a mechanical wave, such as a surface wave, into the circumscribed portion. The controller is also adapted to receive electrical signals from the acoustic transducers. The image resolver uses the electrical signals received by the controller in order to construct an image of an object in physical contact with the imaging surface.

19 Claims, 27 Drawing Sheets

(56) References Cited

U.S. PATENT DOCUMENTS

| | | |
|---|---|---|
| 6,091,406 A | 7/2000 | Kambara |
| 6,159,149 A | 12/2000 | Erikson |
| 6,164,135 A | 12/2000 | Bicz |
| 6,720,712 B2 | 4/2004 | Scott |
| 7,032,454 B2 | 4/2006 | Amano |
| 7,400,750 B2 | 7/2008 | Nam |
| 7,458,268 B2 | 12/2008 | Schneider et al. |
| 7,497,120 B2 | 3/2009 | Schneider et al. |
| 7,568,391 B2 | 8/2009 | Schneider et al. |
| 7,656,932 B2 | 2/2010 | Durand |
| 7,667,374 B2 | 2/2010 | Aono et al. |
| 7,734,435 B2 | 6/2010 | Thomas et al. |
| 7,739,912 B2 | 6/2010 | Schneider et al. |
| 7,770,456 B2 | 8/2010 | Stevenson et al. |
| 8,047,995 B2 | 11/2011 | Wakabayashi et al. |
| 8,054,203 B2 | 11/2011 | Breed et al. |
| 8,085,998 B2 | 12/2011 | Setlak et al. |
| 8,095,328 B2 | 1/2012 | Thomas et al. |
| 8,179,678 B2 | 5/2012 | Yamashita et al. |
| 8,201,739 B2 | 6/2012 | Schneider et al. |
| 8,335,356 B2 | 12/2012 | Schmitt |
| 8,345,508 B2 | 1/2013 | Wodnicki et al. |
| 8,508,103 B2 | 8/2013 | Schmitt et al. |
| 8,536,465 B2 | 9/2013 | Hagiwara et al. |
| 8,576,202 B2 | 11/2013 | Tanaka et al. |
| 8,601,876 B2 | 12/2013 | Schneider et al. |
| 8,617,078 B2 | 12/2013 | Machida et al. |
| 8,666,126 B2 | 3/2014 | Lee et al. |
| 8,692,812 B2 | 4/2014 | Hecht |
| 8,724,869 B2 | 5/2014 | Schneider et al. |
| 8,781,180 B2 | 7/2014 | Schneider et al. |
| 8,791,792 B2 | 7/2014 | Benkley, III |
| 8,982,089 B2 | 3/2015 | Lim |
| 9,044,171 B2 | 6/2015 | Venkatraman et al. |
| 9,056,082 B2 | 6/2015 | Liautaud et al. |
| 9,100,034 B2 | 8/2015 | Oshima |
| 9,132,693 B2 | 9/2015 | Klootwijk et al. |
| 9,170,668 B2 | 10/2015 | Schneider et al. |
| 9,201,546 B2 | 12/2015 | Son et al. |
| 9,276,625 B2 | 3/2016 | Kim et al. |
| 9,323,393 B2 | 4/2016 | Djordjev et al. |
| 9,465,972 B2 | 10/2016 | Chung et al. |
| 9,568,315 B2 | 2/2017 | Naoka, II et al. |
| 9,607,203 B1 | 3/2017 | Yazdandoost et al. |
| 9,613,246 B1 | 4/2017 | Gozzini et al. |
| 9,747,988 B2 | 8/2017 | Yazdandoost et al. |
| 9,778,193 B2 | 10/2017 | Vacca |
| 9,824,254 B1 | 11/2017 | Yazdandoost et al. |
| 9,904,836 B2 | 2/2018 | Yazdandoost et al. |
| 9,952,095 B1 | 4/2018 | Hotelling et al. |
| 9,979,955 B1 | 5/2018 | Guo |
| 9,984,271 B1 | 5/2018 | King et al. |
| 10,061,963 B2 | 8/2018 | Yazdandoost et al. |
| 2003/0102777 A1 | 6/2003 | Kuniyasu et al. |
| 2003/0109993 A1 | 6/2003 | Peat et al. |
| 2004/0140735 A1 | 7/2004 | Scott et al. |
| 2004/0264746 A1 | 12/2004 | Polcha |
| 2006/0196271 A1 | 9/2006 | Jancsik et al. |
| 2008/0142571 A1 | 6/2008 | Yokozuka et al. |
| 2008/0175450 A1 | 7/2008 | Scott |
| 2009/0167704 A1 | 7/2009 | Terlizzi et al. |
| 2012/0092026 A1 | 4/2012 | Liautaud et al. |
| 2013/0015868 A1 | 1/2013 | Peng |
| 2013/0278111 A1 | 10/2013 | Sammoura et al. |
| 2014/0333328 A1 | 11/2014 | Nelson et al. |
| 2014/0352440 A1 | 12/2014 | Fennell et al. |
| 2014/0355381 A1 | 12/2014 | Lal et al. |
| 2014/0359757 A1 | 12/2014 | Sezan et al. |
| 2015/0053006 A1 | 2/2015 | DeCoux et al. |
| 2015/0185898 A1* | 7/2015 | Masson ............... A61B 5/1036 345/177 |
| 2015/0189136 A1* | 7/2015 | Chung, II .......... G06K 9/00013 348/77 |
| 2015/0192547 A1 | 7/2015 | Lee et al. |
| 2015/0358740 A1* | 12/2015 | Tsai ..................... G01N 29/36 73/632 |
| 2016/0063300 A1 | 3/2016 | Du et al. |
| 2016/0092714 A1 | 3/2016 | Yazdandoost et al. |
| 2016/0107194 A1* | 4/2016 | Panchawagh ........... G06F 3/043 367/140 |
| 2016/0117541 A1 | 4/2016 | Lu et al. |
| 2016/0246396 A1* | 8/2016 | Dickinson ........... G06F 3/03545 |
| 2016/0350573 A1* | 12/2016 | Kitchens, II ......... G06K 9/0002 |
| 2017/0053151 A1 | 2/2017 | Yazdandoost et al. |
| 2017/0263022 A1 | 9/2017 | Teshigawara et al. |
| 2017/0357839 A1 | 12/2017 | Yazdandoost et al. |
| 2018/0238734 A1 | 8/2018 | Hotelling et al. |

OTHER PUBLICATIONS

Gumienny et al., "Synthetic aperture acoustic microscope for evaluation of finger tip peripheral skin structure," Proceedings of SPIE, Optical Biophysics, Mar. 30, 1995, doi: 10.1117/12.205999, 5 pages.

* cited by examiner

ACOUSTIC PULSE CODING FOR IMAGING OF INPUT SURFACES

CROSS-REFERENCE TO RELATED APPLICATIONS

This application is a nonprovisional patent application of, and claims the benefit of, U.S. Provisional Patent Application No. 62/234,283, filed Sep. 29, 2015, and titled "Acoustic Imaging System for Spatial Demodulation of Acoustic Waves," and U.S. Provisional Patent Application No. 62/234,492, filed Sep. 29, 2015, and titled "Methods for Biometric Imaging of Input Surfaces," and U.S. Provisional Patent Application No. 62/289,797, filed Feb. 1, 2016, and titled "Acoustic Imaging System for Spatial Demodulation of Acoustic Waves," and U.S. Provisional Patent Application No. 62/316,091, filed Mar. 31, 2016, and titled "Acoustic Pulse Coding for Imaging of Input Surfaces," the disclosures of which are hereby incorporated by reference herein in their entirety.

FIELD

This disclosure relates generally to acoustic imaging systems, and more particularly, to systems and methods for operating an acoustic imaging system as a biometric sensor in conjunction with an input surface of an electronic device.

BACKGROUND

An electronic device can include a biometric sensor, such as a fingerprint sensor, to verify a user's identity. For example, the electronic device can compare fingerprint information obtained by the biometric sensor to fingerprint information stored in a database of verified users.

A conventional fingerprint sensor detects changes in capacitance across an array of electrodes positioned below a dielectric. However, the performance of the conventional sensor is limited by the number and density of electrodes, the thickness and scratch-resistance of the dielectric, the time required to sample each electrode, the processing power of the electronic device, and so on. As such, a user operating an electronic device that incorporates a conventional fingerprint sensor typically perceives delay when operating the sensor, which can negatively affect user experience.

SUMMARY

Embodiments described herein reference an acoustic imaging system configured to obtain an image of the features of an object contacting a surface of a user input surface (e.g., an image of the locations of acoustic impedance mismatch on the surface). In many embodiments, the acoustic imaging system may be configured to resolve an image of a fingerprint of a user contacting an input surface of an electronic device by mapping the ridges of the user's fingerprint to the input surface.

The acoustic imaging system includes a number of acoustic transducers that are configured to generate acoustic outputs (e.g., mechanical waves, acoustic waves, or pulses) into the user input surface in response to a signal from a controller. The controller is configured to provide coded signals such that the acoustic outputs are also coded.

In some embodiments, the acoustic imaging system can employ one or more tomographic reconstruction techniques (e.g., reflection, diffraction, transmission, and so on) to obtain the image of the fingerprint. A tomographic acoustic imaging system includes a controller configured to induce an acoustic pulse or wave within the user input surface. The controller generates the acoustic pulse by applying a drive signal to one or more acoustic transducers then operating in a drive mode. When in the drive mode, an acoustic transducer deforms in response to the drive signal. The drive signal is configured to induce an acoustic pulse (such as a surface wave, shear wave, plane wave, or other acoustic pulse type) that propagates through the thickness of, or across a surface of, the user input surface. In some examples, the acoustic pulse can be a Gaussian pulse, a chirp signal (e.g., multiple periods of varying frequency), a sinusoidal burst (e.g., multiple periods of a single frequency), or any other suitable pulse type or shape.

In many embodiments, the tomographic acoustic imaging system also includes an image resolver configured to construct an image of the object at the contact area. The image resolver receives multiple planar projections (filtered or otherwise) from the controller and assembles an image of the object at the contact area using, in one example, a filtered back projection technique.

In another embodiment, an acoustic imaging system includes a first set of transducers disposed on a first area of a user input surface and a second set of transducers disposed on a second area of the user input surface. The second set of transducers is spaced apart from the first set of transducers. Each transducer in the first set of transducers and the second set of transducer may operate in a drive mode and a sense mode. In the drive mode, the transducer generates a wave that propagates through the user input surface. In the sense mode, the transducer generates an electronic signal when a section of the user input surface adjacent the transducer mechanically deforms as a result of the wave propagating over or through the section. The electronic signal is demodulated based at least in part, on a distance between the first set of transducers and the second set of transducers.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

Figure 1:
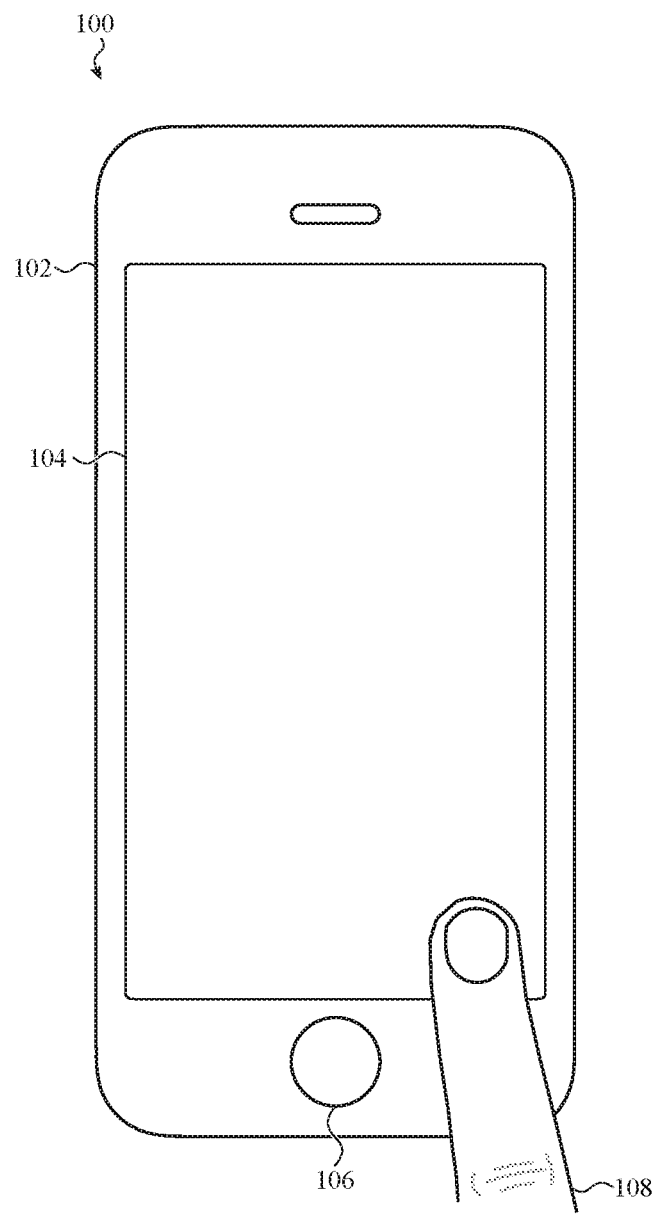
FIG. 1 depicts an example electronic device that can incorporate an acoustic imaging system as such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference an electronic device that incorporates an acoustic imaging system. Typically, the acoustic imaging system is configured to operate as a fingerprint sensor suitable to obtain fingerprint images from a user that touches an external surface of the electronic device, generally referred to herein as an "imaging surface."

Generally and broadly, an acoustic imaging system can be configured to operate or function in a number of ways, several of which are described herein. In one example, the acoustic imaging system generates a mechanical wave or pulse that propagates across the imaging surface. A finger touching the imaging surface interferes with the propagating wave in a specific manner (e.g., via reflection, attenuation, diffraction, absorption, and so on) that corresponds to locations and sizes of the ridges and valleys of the fingerprint of that finger. The acoustic imaging system thereafter analyzes the interference to resolve an image of the fingerprint. Typically, the acoustic imaging system implements tomographic imaging reconstruction techniques, although this may not be required and other suitable image reconstruction techniques can be used.

In many embodiments, the acoustic imaging system includes a number of acoustic transducers (e.g., piezoelectric elements, ultrasonic transducers) arranged in a pattern and mechanically coupled to the imaging surface. In many examples, the acoustic transducers of an acoustic imaging system are arranged to circumscribe a rectangular portion of the imaging surface, although this may not be required.

In many embodiments, the acoustic transducers are multimodal and are configured to convert electrical signals into mechanical energy and, additionally, mechanical energy into electrical signals. In other cases, certain acoustic transducers may be purpose-configured to convert electrical signals into mechanical energy, or may be purpose-configured to convert mechanical energy into electrical signals.

The acoustic imaging system also includes a controller and an image resolver. The controller is adapted to apply an electrical signal to one or more of the acoustic transducers which, in response, generate one or more mechanical waves or pulses into the imaging surface. This operation is referred to herein as a "drive operation" or a "transmission operation" in which a "drive signal" is applied to one or more acoustic transducers. The acoustic transducers can be driven individually, simultaneously, or according to a particular timing pattern (e.g., beam-forming). In many cases, acoustic transducers are driven with a wide-band pulse centered at a selected fundamental frequency, but this may not be required. For example, an acoustic transducer can be driven with a signal having a specific envelope, such as a pulse-coded envelope or a chirp envelope.

As noted above, a finger in contact with the imaging surface interferes with the mechanical wave(s) generated during a drive operation. More specifically, ridges of the fingerprint introduce an acoustic impedance mismatch boundary that causes the mechanical wave(s) to be absorbed, to reflect, and/or to diffract. Accordingly, the controller is also adapted to receive electrical signals generated by the acoustic transducers as a result of those reflections, diffractions, and absorptions. This operation is referred to herein as a "sensing operation" or a "read operation" in which signals generated by one or more acoustic transducers are "read."

Thereafter, the image resolver obtains the electrical signals read by the controller and constructs a map or image of the finger in contact with the imaging surface. Typically, the image resolver implements a tomographic image reconstruction technique, although this may not be required.

For example, in one embodiment, the image resolver is configured to receive acoustic reflections caused by a user's fingerprint. The image resolver reconstructs an image of the fingerprint using spatial and temporal filtering techniques to isolate reflections that result from a particular vector path from an acoustic transducer, to the finger, and back to an acoustic transducer. Once a sufficient number of reflections and/or vector paths are obtained, an image of the fingerprint can be calculated using reflection tomography and/or diffraction tomography techniques, several of which are described below.

In another example, the image resolver is configured to receive acoustic waves that are affected by attenuation caused by a user's fingerprint (e.g., transmitted across a user's fingerprint). As with reflection and/or diffraction tomography embodiments referenced above, the image resolver in this embodiment reconstructs an image of the fingerprint using spatial and temporal filtering techniques to isolate particular vector paths from an acoustic transducer, across the fingerprint, and to another acoustic transducer. Once a sufficient number of vector paths are obtained, an image of the fingerprint can be calculated using transmission tomography techniques, several of which are described below.

In many embodiments, the operational configuration of an image resolver can affect the distribution of acoustic transducers on the imaging surface. Several example distributions of acoustic transducers, each of which may be suitable in certain configurations for transmission tomography embodiments, reflection tomography embodiments, or diffraction tomography embodiments, are described herein.

Further, for simplicity of description, the embodiments that follow are described in reference to an acoustic imaging system associated with a display of a portable electronic device, such as a cellular phone or a tablet. In this example, the imaging surface is typically a cover glass or other external surface positioned over the display. The acoustic imaging system is typically coupled to an underside of the imaging surface, accommodated within the housing of the portable electronic device. However, it may be appreciated that this specific configuration is not required and a system such as described herein can be implemented in any suitable manner and can be incorporated into any suitable electronic device including, but not limited to, wearable electronic devices, laptop devices, desktop devices, automotive or aeronautical information or entertainment systems, gaming devices, home or commercial appliances, industrial control devices, and so on.

These and other embodiments are discussed below with reference to FIGS. 1-15. However, those skilled in the art will readily appreciate that the detailed description given herein with respect to these figures is for explanatory purposes only and should not be construed as limiting. The section headings which appear throughout the description are provided for convenience and organizational purposes only and are not intended to restrict or limit the disclosure within any particular section to the embodiments, modifications, alternatives, details, features, and/or characteristics described in that section.

FIG. 1 depicts an example electronic device that can include an acoustic imaging system such as described herein. The acoustic imaging system can be configured in any suitable manner to obtain an image of a fingerprint of a user that touches a display of the electronic device. The acoustic imaging system can be configured to implement reflection tomography, diffraction tomography, transmission tomography, or any other suitable image reconstruction technique.

In the illustrated example, the electronic device 100 is implemented as a portable electronic device such as a cellular phone, although such a form factor is not required. The electronic device 100 includes a housing 102 and a display 104. The display 104 is disposed below a cover configured to protect the display 104. In many cases, the cover can be formed from an optically transparent and mechanically rigid material such as glass, sapphire, polycarbonate, and the like. The cover can be flat or curved. The cover can extend around the edges or sidewalls of the housing 102, although this may not be required. The cover can be layered or formed from a single material.

In many examples, the display 104 includes one or more of a variety of display elements or layers. For example, the display 104 may include a liquid crystal display, a thin film transistor display, an organic light emitting diode display, organic electroluminescence display, or other type of display. The display 104 may be used to present visual information to the user and may be operated in accordance with one or more display modes or the software applications being executed on the electronic device 100. In many cases, the display 104 can include or operate in conjunction with one or more input devices. For example, the display 104 may be configured to receive touch, gesture, and/or force input.

The electronic device 100 can also include one or more input elements such as a button 106. The button 106 may be a physical button such as a push button or switch. In other examples, the button 106 can be a touch input device that does not physically depress such as a capacitive button. In other cases, the button 106 can be a virtual button shown on the display 104.

In many embodiments, an acoustic imaging system (not shown) is disposed within the housing 102 of the electronic device 100 and coupled to the cover of the display 104. The acoustic imaging system is configured to obtain an image of an object, such as the pad of a finger (e.g., fingerprint) of a user 108, in physical contact with the cover.

In one example, the acoustic imaging system is positioned around the perimeter of a portion of the cover that may regularly receive touch input of a user 108, such as a bottom portion of the cover adjacent the button 106. In this manner, each time (or at selected times based on operational modes of the electronic device 100) the user 108 presses a bottom portion of the display 104, the acoustic imaging system can be used to resolve an image of a fingerprint of the user 108. In other cases, more than one fingerprint image can be resolved at the same time.

In another example, the acoustic imaging system is positioned around the entire perimeter of the display 104. In this manner, each time the user 108 presses any portion of the display 104, the acoustic imaging system can be used to resolve an image of a fingerprint of the user 108.

In other examples, the acoustic imaging system is positioned adjacent a non-display portion of the electronic device 100. For example, the acoustic imaging system can be positioned around the perimeter of a cap of the button 106. The acoustic imaging system depresses with the button 106. In this manner, each time the user 108 presses the button 106, the acoustic imaging system can be used to map a fingerprint of the user 108.

In yet another example, the acoustic imaging system is positioned adjacent a non-input portion of the electronic device 100. For example, the acoustic imaging system can be within or coupled to the housing 102 of the electronic device 100. In this manner, each time the user 108 holds the electronic device 100 in the user's hand, the acoustic imaging system can be used to map a fingerprint or handprint of the user 108.

Once an image of fingerprint (or other biometrically-unique surface characteristics such as handprints, ear prints, and so on) of the user 108 is mapped by the acoustic imaging system, the obtained image (and/or data derived therefrom, such as the output of a mathematical function such as a hashing function) can be compared to a database of known images or data to determine if the obtained image matches a known image. If an affirmative match is obtained, the electronic device 100 can perform a function or task related to the match. In one example, the electronic device 100 performs an authenticated function, such as displaying financial information or trade secret information on the display 104.

In another example, an acoustic imaging system can be configured to map the biometrically-unique features of a user's ear (e.g., size, shape, skin patterns, and so on) each time the user raises the electronic device 100 to the user's ear. In another example, an acoustic imaging system can be configured to map the biometrically-unique features of a user's hand print (e.g., skin patterns, scar patterns, and so on) each time the user grasps the electronic device 100 in the user's hand. In some cases, the electronic device can respond differently if the electronic device determines that it is being held by the user 108 in the user's left or right hand.

In still further examples, the acoustic imaging system can be used for more than one purpose. For example, the acoustic imaging system may be used as a touch sensor in addition to a fingerprint sensor. In other cases, the acoustic imaging system can be used exclusively for touch sensing.

The foregoing embodiments depicted in FIG. 1 and the various alternatives thereof and variations thereto are presented, generally, for purposes of explanation, and to facilitate an understanding of various possible methods for dividing and/or distributing the processing and/or signal conditioning load of an acoustic imaging system such as described herein. Instead, the depicted examples are understood to be merely a subset of the representative embodiments of an electronic device that can incorporate an acoustic imaging system such as described herein that may be implemented within the spirit and scope of this disclosure.

Figure 2:
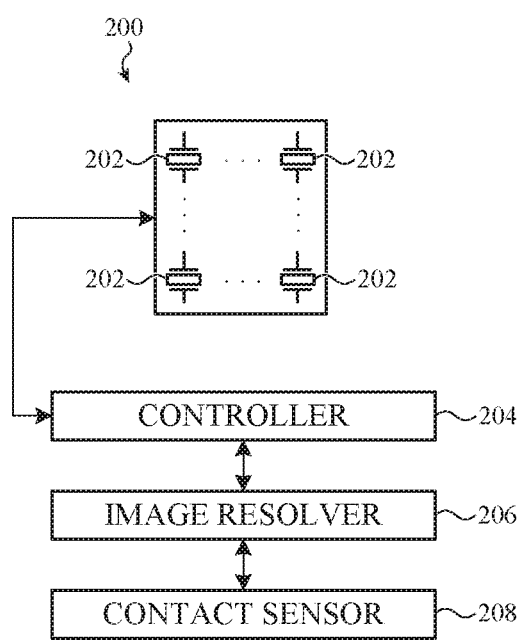
FIG. 2 depicts a simplified block diagram of an acoustic imaging system.

FIG. 2 depicts a simplified block diagram of an acoustic imaging system. The acoustic imaging system 200 includes a distribution of acoustic transducers, identified as the acoustic transducers 202, arranged in a rectangular configuration (although this is not required of all embodiments and other patterns and arrangements are possible). Each of the acoustic transducers 202 contract or expand in response to an electrical signal supplied by a controller 204. In many examples, the acoustic transducers are formed with a piezoelectric material as lead zircanate titinate, zinc oxide, aluminum nitride, potassium niobate, bismuth titinate, or any other piezoelectric material.

The acoustic transducers can be coupled to an imaging surface (not shown), such as the cover of the display 104 of the electronic device 100 as shown in FIG. 1. In another example, the acoustic transducers can be coupled to a support or a frame within the electronic device 100.

In many examples, the acoustic transducers are arranged to circumscribe an interior portion of the imaging surface. For example, the acoustic transducers 202 can circumscribe a rectangular area. In this manner, the acoustic transducers 202 follow the periphery or perimeter of the circumscribed portion. In other cases, the distribution of acoustic transducers 202 can circumscribe a different area, such as a square, circular, polygonal, or arbitrarily-shaped area. In many cases, the acoustic transducers are formed onto a top or bottom imaging surface nearby the imaging surface's edge, although this is not required.

In many embodiments, the acoustic transducers are configured for both inducing and detecting mechanical waves (e.g., shear waves, surface waves, longitudinal waves, transverse waves, cylindrical waves, and so on) in or on the imaging surface. In other words, an acoustic transducer can be operated in more than one mode. An acoustic transducer operated in a drive mode generates a mechanical wave in the imaging surface in response to an electrical signal from the controller 204. The same acoustic transducer operated in a sense mode generates an electrical signal in response to a mechanical wave within the imaging surface.

In other embodiments, certain acoustic transducers of the distribution of acoustic transducers 202 can be configured to operate in only a drive mode or a sense mode. A drive acoustic transducer can be paired with, or positioned adjacent to, a sense acoustic transducer. In one example, a row of drive acoustic transducers is positioned adjacent a row of sense acoustic transducers. Other implementation-specific configurations, groups, and arrangements of drive acoustic transducers and sense acoustic transducers can be used in particular embodiments.

The controller 204 is configured to provide electrical energy in the form of an electrical signal (e.g., impulse, square wave, triangular wave, sine wave, or other waveform) to each acoustic transducer of the distribution of acoustic transducers 202. In some cases, an acoustic transducer may be configured to resonate at a particular frequency, but this may not be required.

In one example, the controller 204 can provide a first voltage to a first acoustic transducer and a second voltage to a second acoustic transducer. In addition, the controller 204 can control the duration, envelope, and magnitude of the voltage applied to each independent acoustic transducer of the one or more acoustic transducers. In some cases, the controller 204 applies the same electrical signal to each acoustic transducer simultaneously, whereas in others, different signals and/or different timing patterns are provided to different acoustic transducers.

In one embodiment, the controller 204 applies an electrical signal to groups or sets of acoustic transducers. For example, if the distribution of acoustic transducers 202 are arranged to circumscribe a rectangular area, the controller 204 can apply an electrical signal the group of acoustic transducers forming a top edge of the rectangular area. Thereafter, the controller 204 can apply an electrical signal to the group of acoustic transducers forming a right edge, left edge, or bottom edge of the rectangular area. In other cases, alternating acoustic transducers can be driven at the same time.

The controller 204 can also operate in one or more modes. In certain embodiments, the controller 204 is operated in a transmission mode. Herein, the term "transmission mode" refers to a controller mode in which the controller provides electrical energy (e.g., drives) to one or more acoustic transducers.

When in the transmission mode, the controller 204 is configured to provide electrical energy in the form of an electrical signal to one or more of the acoustic transducers of the distribution of acoustic transducers 202. In response, the acoustic transducers produce an acoustic output in the form of a mechanical wave within the imaging surface, directed inwardly toward the circumscribed portion. In many embodiments, the electrical energy provided by the controller 204 is an abbreviated electrical pulse that induces a mechanical wave in the imaging surface. In many cases, the controller 204, in a transmission mode, induces the acoustic transducers to generate a substantially longitudinal and/or planar mechanical wave with minimal transverse components (e.g., pressure pulse, surface wave, or pulse wave).

As noted above, the controller 204 can apply an electrical signal to groups of acoustic transducers. In this case, the controller 204, in a transmission mode, induces a selected group of acoustic transducers to generate a substantially longitudinal and/or planar mechanical wave, with minimal transverse components, that traverses the imaging surface substantially parallel to the group. For example, if the distribution of acoustic transducers 202 are arranged to circumscribe a rectangular area, the controller 204 can apply an electrical signal the group of acoustic transducers forming a top edge of the rectangular area, which, in turn, induces a substantially longitudinal and/or planar mechanical wave that traverses the rectangular area toward a bottom edge thereof. Similarly, the controller 204 can induce a mechanical wave that traverses the rectangular area from a right edge to a left edge, from a left edge to a right edge, and from a bottom edge to a top edge.

In still other examples, the controller 204 can induce a mechanical wave from a portion of one edge, or a mechanical wave that traverses the circumscribed portion at an angle. For example, a controller 204 can induce a mechanical wave to traverse the circumscribed portion from a right edge of the circumscribed portion to the top edge of the circumscribed portion.

In other embodiments, in a transmission mode, the controller 204 can apply an electrical signal to an individual acoustic transducer. More generally, the controller 204 can apply an electrical signal to a single acoustic transducer, a group of acoustic transducers, a line of acoustic transducers, all acoustic transducers, a pattern of acoustic transducers, and so on. The controller 204 may (in the transmission mode), in some embodiments, apply the electrical signal(s) at different times to induce different mechanical waves within the imaging surface. For example, the controller 204 can be configured to induce a plane wave, a series of plane waves, an angular wave, a patterned wave, or any other suitable wave or waves.

After producing the mechanical wave or waves within the imaging surface with one or more acoustic transducers, the controller 204 can transition into a receiving mode. In a receiving mode, the controller 204 couples to one or more acoustic transducers, sampling electrical signals generated thereby over a period of time. In many cases, the controller 204 transitions to the receiving mode immediately after generating the mechanical wave in the transmission mode. For example, the controller 204 (in the transmission mode) can apply an electrical signal to a single acoustic transducer, after which the same acoustic transducer and/or other acoustic transducer(s) adjacent to or separated from that acoustic transducer can be monitored by the controller 204 (in the receiving mode) for electrical signals generated in response to received acoustic reflections, diffractions, or absorptions.

An image resolver 206 communicates with the controller 204 and a touch sensor 208. The image resolver obtains the electrical signals received by the controller 204 in the receiving mode. If a finger is not in physical contact with the imaging surface (as determined by the touch sensor 208), the mechanical wave is not disturbed and only minimal, if any, reflection, diffraction, or attenuation the energy of the mechanical wave occurs as the wave traverses of the circumscribed portion of the imaging surface.

Alternatively, if a finger is in contact with the imaging surface, one or more acoustic impedance mismatch boundaries are introduced that cause the mechanical wave generated during a drive operation (e.g., transmission mode of the controller 204) to reflect, diffract, or attenuate the energy of that mechanical wave. The image resolver 206 constructs an approximated map (e.g., image) of the object by analyzing the signals received by the controller 204. In many cases, the image resolver 206 employs a spatial filtering technique to generate an image of the object in contact with the imaging surface.

As used herein, the term "image" or the phrase "resolved image" refers to a two-dimensional collection of pixels, generated by an image resolver or similar component, system or system (e.g., the image resolver 206). The coordinates of a resolved image can correspond to local surface characteristics of an imaging surface that may change when an object, such as a user's finger, is placed in contact with the imaging surface at that location. The area over which an object contacts the input surface is referred to herein as the "contact area." In many cases, the contact area is determined by the touch sensor 208.

Reflection/Diffraction-Based Image Resolver

In some embodiments, each pixel of a resolved image corresponds to a partial reflection of an acoustic pulse propagating through the input surface at that respective pixel location. Such embodiments are referred to here as "reflection-based" image resolver embodiments. In certain embodiments, an image resolver can operate in more than one mode, which may include a reflection mode.

For a reflection-based image resolver (or an image resolver in a reflection mode), the amount of reflection or diffraction (e.g., collectively, a "reflection coefficient") associated with a particular location of an imaging surface corresponds to a value (e.g., darkness, lightness, color, brightness, saturation, hue, and so on) of the associated pixel of the resolved image.

The resolution of the resolved image generated by a reflection-based image resolver (and thus the number and/or distribution of pixels) can be based, at least in part, on the expected or average size of various features of the user's fingerprint. In one example, the resolution of the resolved image generated by a reflection-based image resolver is greater than 100 pixels per centimeter. In some cases, the resolution of the resolved image may be non-uniform; certain areas of the resolved image may have a higher resolution than other areas.

As may be appreciated, the reflection coefficient(s) associated with a particular location of the imaging surface (e.g., a "local reflection coefficient") changes when a fingertip (or more particularly, a "feature" of a fingertip, such as a ridge) is in physical contact with the imaging surface at that specific location. As noted with respect to other embodiments described herein, this is due to an acoustic impedance mismatch introduced at that location by features of the fingerprint.

In this manner, the value of each pixel of the resolved image corresponds to whether or not a feature of a fingertip is in contact with the imaging surface—and causes a reflection—at that pixel location. As such, the pixels of the resolved image generated by a reflection-based image resolver correspond to whether a ridge or a valley of a user's fingerprint is present at that pixel location.

Accordingly, an acoustic imaging system incorporating a reflection-based image resolver such as described herein (e.g., the acoustic imaging system 200) can be configured to resolve an image of a user's fingerprint by resolving an image of the acoustic reflection effects provided by various features of the fingertip that make physical contact with the imaging surface at different locations. Embodiments employing such techniques are generally referred to herein as "reflection/diffraction tomography acoustic imaging system." The acoustic imaging system 200 can be implemented as a reflection/diffraction tomography acoustic imaging system.

Generally and broadly, a reflection/diffraction tomography acoustic imaging system such as described herein may be multimodal or may be configured to operate only in a single mode. For example, a reflection/diffraction tomography acoustic imaging system may be configured to obtain an estimation of an acoustic reflection map by reflection/diffraction-based tomographic reconstruction techniques or by diffraction-based tomographic reconstruction techniques.

In other examples, a reflection/diffraction tomography acoustic imaging system may be configured to use both reflection/diffraction and diffraction based tomographic reconstruction techniques. In still further examples, a reflection/diffraction tomography acoustic imaging system may be configured to use additional tomographic reconstruction techniques associated with, but not limited to: acoustic diffraction, acoustic impedance, acoustic reflection, acoustic transmittance, acoustic pulse phase shifting, and so on.

Generally, the phrase "reflection information" as used herein references the raw spatial and temporal information received by an acoustic transducer that corresponds to the reflection(s) that result from the introduction of one or more acoustic pulses into an imaging surface, whether such information is contained in one or more electrical signals, digital values, voltage or current values, mechanical waves, or any other suitable format or translation. In many cases, reflection information will include noise, parasitic acoustic modes, multipath propagation effects, attenuation, and so on, that may be filtered, reduced, or otherwise eliminated in a processing operation performed by the image resolver 206.

The quantity of reflection information accumulated by the acoustic imaging system incorporating a reflection-based image resolver generally increases with the number of transmitting operations performed. As such, it may be typical for an acoustic imaging system incorporating a reflection-based image resolver to perform a large number of transmitting operations prior to generating a fingerprint image.

For example, an transmitting operation can be performed with a single acoustic transducer. In this example, the single acoustic transducer generates an acoustic pulse and collects reflection information while all other acoustic transducers are idle. Such embodiments are referred to herein as "single-pulse transmitting operations." The acoustic imaging system incorporating a reflection-based image resolver may be idle during the travel time of the acoustic pulse from the acoustic transducer to the contact area and during the return travel time of the acoustic pulse from the contact area back to the acoustic transducer. A subsequent single-pulse transmitting operation performed with the same or a different acoustic transducer may be initiated after a short dissipation period has elapsed. As used herein the term "dissipation period" refers to a period of time required for acoustic energy introduced to the imaging surface to dissipate. In this manner, the full "time of flight" for a single-pulse transmitting operation is defined by the propagation time required for the acoustic pulse to reach the contact area, the reflection propagation time required for the reflection of the contact area to reach the acoustic transducer, and the dissipation period required before a subsequent transmitting operation can be performed.

In other cases, multiple single-pulse transmitting operations may be performed in sequence with the same acoustic transducer. The reflection information accumulated as a result of these multiple single-pulse transmitting operations may be averaged.

Once a sufficient number of transmitting operations are performed, the acoustic imaging system 200 incorporating a reflection-based image resolver, such as the image resolver 204, can manipulate, filter, or process the accumulated reflection information associated with certain vector paths through the imaging surface to generate to an image of the user's fingerprint. The image resolver 204 can implement any suitable image reconstruction technique. In one example, the image resolver 204 uses a tomographic image reconstruction technique, but this is not required.

The acoustic pulse of a particular transmitting operation may be generated in any suitable manner. For example, an acoustic pulse can be generated by applying a varying voltage signal to an acoustic transducer.

In other embodiments, each acoustic transducer of the acoustic imaging system incorporating a reflection-based image resolver is tuned and/or configured to resonate at a particular frequency. Any suitable resonant frequency can be selected, although in many embodiments, the resonant frequency is based, at least in part, on the Nyquist sampling rate required to reliably distinguish the ridges and valleys of the average user's fingerprint from one another. More specifically, the Nyquist sampling rate relates to the spatial frequency bandwidth (e.g., maximum wavelength defined by the speed of sound through the input surface) required to reliably distinguish the ridges and valleys of a fingerprint. In other embodiments, the resonant frequency of the acoustic transducers may also be based, at least in part, on the speed of sound through the imaging surface.

Although many embodiments provide acoustic transducers that are tuned to the same resonant frequency, this may not be required. For example, an acoustic transducer disposed near an edge of the imaging surface may be tuned to resonate at a different frequency than an acoustic transducer disposed near a centerline of the same imaging surface. In other embodiments, adjacent acoustic transducers may be tuned to different resonant frequencies so that adjacent acoustic transducers can be operated simultaneously. Without regard to a particular resonant frequency, the phrase "resonant mode" is used herein to refer to an acoustic transducer operated at or near resonance, whether such an acoustic transducer is associated with a reflection-based image resolver or any other suitably-configured image resolver or acoustic imaging system.

For embodiments in which an acoustic transducer has a specifically-tuned resonant mode, an acoustic pulse can be generated by applying an impulse voltage signal (e.g., a voltage signal of finite duration) to the acoustic transducer. The impulse voltage signal, having a bandwidth that includes the resonant frequency, triggers the resonant mode. During the resonant mode, the acoustic transducers outputs acoustic energy for one or more periods of the resonant frequency resulting in an acoustic pulse that propagates across the imaging surface. In this manner, the acoustic pulse has a carrier frequency approximately equal to the resonant frequency. In one example, the resonant frequency is approximately 5 MHz. In these embodiments, a single-pulse transmitting operation can be performed by applying an impulse voltage signal to a single acoustic transducer.

In other embodiments, a coded series of impulse voltage signals can be applied to one or more acoustic transducers. The series of impulse voltage signals generates a coded series of acoustic pulses that traverse the imaging surface as a series.

As a result of the coding, the acoustic imaging system incorporating a reflection-based image resolver may be able to perform several transmitting operations in rapid sequence. These embodiments are referred to herein as "multi-pulse transmitting operations." The reflection information associated with each pulse in a multi-pulse transmitting operation may be averaged together. In this manner, the full time of flight for a multi-pulse transmitting operation is defined by the propagation time required for the last acoustic pulse of the series to reach the contact area, the reflection propagation time required for the last reflection of the contact area to reach the acoustic transducer, and the dissipation period required before a subsequent transmitting operation can be performed. It is appreciated that the full time of flight for a multi-pulse transmitting operation is similar to, albeit slightly longer than, the full time of flight for a single-pulse transmitting operation.

The series of impulse voltage signals of a multi-pulse transmitting operation may be coded in any suitable manner including, but not limited to, phase coding, multi-level coding, chirp coding, and so on. The phrases "impulse coding," "impulse-coded," or "impulse-coded acoustic pulse" generally refer to the acoustic pulses generated as a result of a series of discrete voltage impulses provided to at least one acoustic transducer in a particular pattern of phase, amplitude, and/or timing.

In some embodiments, the acoustic imaging system incorporating a reflection-based image resolver may exclusively perform single-pulse transmitting operations. In other embodiments, the acoustic imagining system may exclusively perform multi-pulse transmitting operations. In many embodiments, however, the acoustic imaging system incorporating a reflection-based image resolver may shift between single-pulse transmitting operations and multi-pulse transmitting operations. For example, a single-pulse transmitting operation may be performed when a contact area is nearby an edge of the imaging surface or when the contact area is nearby the acoustic transducers. In other cases, a multi-pulse transmitting operation may be performed when the contact area is within a central portion of the imaging surface. It may be appreciated that the listing given above is not exhaustive; other embodiments may perform a variety of transmitting operations in any other suitable implementation-specific or appropriate manner or pattern.

In still further embodiments, two or more transmitting operations, whether single-pulse or multi-pulse, may be propagated simultaneously. These acoustic pulses may be propagated orthogonal to one another such that reflections corresponding to one of the acoustic pulses do not destructively interfere with reflections corresponding to the other acoustic pulse. The phrases "spatial coding," "spatially-coded," or "spatially-coded acoustic pulse" generally refer to the acoustic pulses generated as a result of one or more voltage impulses provided to at least two acoustic transducers that are generally oriented orthogonal to one another.

In these embodiments, the acoustic imaging system incorporating a reflection-based image resolver maybe configured to generate multiple impulse-coded and spatially-coded acoustic pulses that can be propagated across an imaging surface simultaneously, thereby operating in a more time-efficient manner.

Example embodiments of acoustic imaging systems incorporating reflection-based image resolver, and various techniques for implementing reflection or diffraction tomography are described in greater detail in reference to FIGS. 6-8F.

Attenuation-Based Image Resolver

In other embodiments, each pixel of a resolved image corresponds to an attenuation to an acoustic pulse propagating through that respective pixel location. Such embodiments are referred to here as "attenuation-based" image resolver embodiments. In certain embodiments, an image resolver can operate in more than one mode, which may include an attenuation mode.

The amount of attenuation (e.g., an "attenuation coefficient") at a particular location corresponds to a value (e.g., darkness, lightness, color, brightness, saturation, hue, and so on) of the associated pixel of the resolved image. For example, the attenuation coefficient may be a number from 0 to 1.0, and the corresponding pixel may include a brightness value from 0 to 255 units. In other cases, other resolutions or representations are possible. In this example, the attenuation coefficient and the brightness of the corresponding pixel value may be linearly related, although such a relationship is not necessarily required of all embodiments.

As with other embodiments described herein, the resolution of the resolved image generated by an attenuation-based image resolver (and thus the number and/or distribution of pixels forming the same) can be based, at least in part, on the expected or average size of various features of the user's fingerprint. In one example, the resolution of the resolved image is greater than 120 pixels per centimeter (approximately 300 pixels per inch). In further examples, the resolution of the resolved image is greater than or equal to 200 pixels per centimeter (approximately 500 pixels per inch). In still further examples, other resolutions may be suitable. In some cases, the resolution of the resolved image may be non-uniform; certain areas of the resolved image may have a higher resolution than other areas.

As may be appreciated, the attenuation coefficient associated with a particular location of the input surface (e.g., a "local attenuation coefficient") changes when a fingertip is in physical contact with the input surface at that specific location. This is due to an acoustic impedance mismatch introduced by the fingertip to the input surface at that location.

For example, a feature of a fingertip in direct physical contact with the input surface at a particular location (e.g., a ridge of a fingerprint) attenuates an acoustic pulse propagated therethrough, thereby affecting the value of the associated pixel of the resulting image. Conversely, a feature that does not contact the input surface (e.g., a valley of a fingerprint) may not substantially attenuate acoustic pulses propagated therethrough, similarly not affecting the value of the associated pixel of the resulting image.

In this manner, the value of each pixel of the resolved image corresponds to whether or not a feature of a fingertip is in contact with the input surface at that pixel location. More specifically, the pixels of the resolved image generated by an attenuation-based image resolver correspond to whether a ridge or a valley of a user's fingerprint is present at that pixel location. In this manner, the resolved image may serve as a direct proxy for an image of the user's fingerprint.

Furthermore, different features of a fingertip may introduce different acoustic impedance mismatches, thus resulting in different local attenuation coefficients and different pixel values in the resolved image. For example, denser features of the fingertip (e.g., scar tissue) contacting the input surface may change local attenuation coefficient(s) differently than less dense features contacting the input surface. In other cases, the force with which the user touches the input surface may affect local attenuation coefficients by compressing the fingertip against the input surface. In this manner, the resolved image may exhibit contrast corresponding to the relative density of features of the fingertip.

Accordingly, generally and broadly, an acoustic imaging system that incorporates an attenuation-based image resolver such as described herein is configured to resolve an image of a user's fingerprint by resolving an image of the acoustic attenuation effects provided by various features of the fingertip that make physical contact with the input surface at various location. Such an image is referred to herein as an "acoustic attenuation map" of an input surface or contact area.

In some embodiments, an acoustic attenuation map can be modeled as a matrix, a vector, or as a function, the inputs of which are coordinates that correspond to locations on the input surface. In one example, the estimated attenuation coefficient $\alpha_{x_1,y_1}$ associated with a point $(x_1,y_1)$ on the input surface can be modeled by the following equation:

$$\alpha_{x_1,y_1} = f_m(x_1,y_1) \quad \text{Equation 1}$$

It may be appreciated that an acoustic imaging system such as described herein can obtain, resolve, or estimate an acoustic attenuation map (such as the function $f_m(x,y)$ of Equation 1) of an input surface (or contact area of the input surface) using any suitable or implementation-specific method or combination of methods, several of which are described in detail below.

For example, in one embodiment, an acoustic imaging system incorporating an attenuation-based image resolver employs tomographic reconstruction techniques to estimate an acoustic attenuation map of a contact area. Embodiments employing such techniques are generally referred to herein as "transmission tomography acoustic imaging system." The acoustic imaging system 200 can be implemented as a transmission tomography acoustic imaging system.

Generally and broadly, a transmission tomography acoustic imaging system such as described herein may be multi-modal or may be configured to operate only in a single mode. For example, a transmission tomography acoustic imaging system may be configured to obtain an estimation of an acoustic attenuation map by transmission-based tomographic reconstruction techniques or by diffraction-based tomographic reconstruction techniques.

In other examples, a transmission tomography acoustic imaging system may be configured to use both transmission and diffraction based tomographic reconstruction techniques. In still further examples, a transmission tomography acoustic imaging system may be configured to use additional tomographic reconstruction techniques associated with, but not limited to: acoustic diffraction, acoustic impedance, acoustic reflection, acoustic transmittance, acoustic pulse phase shifting, and so on.

For embodiments configured to operate with transmission-based tomographic techniques, the transmission tomography acoustic imaging system can be configured to estimate an acoustic attenuation map of a contact area at which a user's fingertip touches the input surface through analysis of multiple planar projections of that contact area. A planar projection of the contact area may be obtained by propagating an acoustic pulse across the input surface and thereafter measuring, at multiple locations, the amplitude of the acoustic pulse that transmitted through the contact area. The acoustic pulse typically has a high-frequency carrier.

Collectively, the multiple measured amplitudes represent a discretized projection of the contact area onto a plane orthogonal to the input surface. This projection is referred to herein as a "planar projection" of the contact area and the angle between the projection plane and the plane of the input surface is referred to, generally, as the "angle" of the planar projection, or more particularly, the angle at which the planar projection is taken.

In some examples, the acoustic pulse can be a plane wave generated to exhibit a planar wavefront that is oriented in any suitable manner relative to an axis (e.g., horizontal axis or vertical axis) of the plane of the input surface. As used herein the term "wavefront" generally refers to portions of an input surface affected by the same phase of the acoustic pulse, at the same amplitude, at a particular time. For example, the acoustic pulse can exhibit a planar wavefront that traverses the input surface parallel to a horizontal axis thereof (e.g., traversing the contact area from right to left or left to right). In other cases, the acoustic pulse can be a plane wave with a planar wavefront that traverses the input surface perpendicular to the horizontal axis thereof (e.g., traversing the contact area from top to bottom or bottom to top). In still further cases, the acoustic pulse can be a plane wave with a planar wavefront that traverses the input surface at any arbitrary angle relative to the horizontal axis thereof.

Herein, the term "direction" of an acoustic pulse refers to the angle at which a wavefront of an acoustic pulse traverses the input surface, relative to a horizontal axis of the input surface. In some cases, the controller can implement beamforming techniques in order to direct the acoustic pulse along a particular path. Typically, as may be appreciated, the direction of a planar wavefront is equal to the angle of the planar projection obtained after propagating that wavefront.

In some examples, the acoustic pulse can be generated from a point source, inducing a wave that exhibits a spherical wavefront. In these embodiments, the direction of the acoustic pulse may be based on the angle of a vector originating at the point source and intersecting the geometric center of the contact area. In these examples, the transmission tomography acoustic imaging system may apply spatial filtering techniques to the planar projection in order to spatially normalize (e.g., linearize) the various values of the same, each of which may be at a different angle relative to the point source. In other cases, different values of different planar projections which are approximately parallel to one another may be combined into a single planar projection.

In many embodiments, a transmission tomography acoustic imaging system configured for transmission-based reconstruction obtains a number of differently-angled planar projections as a set. In some cases, the various planar projections of the set of planar projections may be taken at regular angular intervals around the contact area, although this is not required. The set of planar projections of the contact area, each taken at different angles, is referred to herein as the Radon transform (e.g., sinogram) of the contact area.

The transmission tomography acoustic imaging system can calculate or estimate the inverse Radon transform of the contact area in any number of suitable ways. In one embodiment, the transmission tomography acoustic imaging system constructs a system of equations based on, at least, the location of each pixel and the values of each planar projection.

In other embodiments, the transmission tomography acoustic imaging system can utilize a filtered back projection technique (or any other suitable inverse Radon transform calculation technique, either discrete or continuous) to combine and/or interlace the set of planar projections together in order to generate an acoustic attenuation map of the contact area which, in turn, can be used as a direct proxy for an image of the user's fingerprint.

To perform the operations described above, a transmission tomography acoustic imaging system includes several acoustic transducers that are coupled to the input surface. Additionally, the transmission tomography acoustic imaging system includes a controller and an image resolver. Generally and broadly, the controller provides electrical signals to, and obtains electrical signals from, the acoustic transducers. As noted above, the received electrical signals correspond to (either before or after filtering), a planar projection of the contact area. The controller then provides the received electrical signals (e.g., the planar projection(s)) to the image resolver which processes the signals to obtain the acoustic attenuation map by determining or approximating the inverse Radon transform of the same.

Alternatively or additionally, a transmission tomography acoustic imaging system can be configured to utilize diffraction-based reconstruction techniques. In these embodiments, the transmission tomography acoustic imaging system can be configured to estimate an acoustic attenuation map of a contact area at which a user's fingertip touches the input surface through analysis of various frequency-domain spectra received as a result of diffraction of an acoustic pulse traversing the contact area. As with other embodiments described herein, the transmission tomography acoustic imaging system may propagate an acoustic pulse across the input surface and thereafter measure, at multiple locations, the amplitude of the acoustic pulse that transmitted through the contact area. As with other embodiments, the acoustic pulse typically has a high-frequency carrier.

In this example, when an acoustic pulse reaches the contact area, a portion of the energy of the acoustic pulse may be absorbed (e.g., attenuated), such as described above. Additionally, the acoustic pulse may be diffracted (e.g., de-focused or spread). The amount of diffraction at a particular point is based on the properties, both physical and acoustic, of the feature of the object in contact with the surface of the contact area at that point.

Furthermore, the envelope of the diffraction pattern may be predictable based on the location of the feature. For example, a feature that is physically close to the point (or points) from which the acoustic pulse was generated may diffract the pulse in a fan pattern (e.g., a conic section of the input surface oriented parallel to the direction of the wavefront of the acoustic pulse). The width of the diffraction pattern envelope may depend upon the relative distance between the feature causing the diffraction and the source of the acoustic pulse and/or the distance between the feature causing the diffraction and the location(s) at which the system measures the diffraction. Utilizing the predicted diffraction envelope, the transmission tomography acoustic imaging system can spatially filter signals received (e.g. the received electrical signals) in order to obtain electrical signals that fall within a fan pattern (e.g., diffraction envelope) that may be generated as a result of the acoustic pulse passing through a particular point of the contact area.

After spatial filtering, the transmission tomography acoustic imaging system can calculate the Fourier transform (or any other suitable frequency-domain transform, in either discrete or continuous time) of the electrical associated with a particular spatially-filtered fan pattern. In many embodiments, the transmission tomography acoustic imaging system may utilize frequency and/or phase information of the Fourier transform in order to back-project an estimated attenuation value onto the specific location of the contact area. After a sufficient number of back projections for a particular location of the contact area are obtained, the attenuation coefficient of the location may be estimated.

Example embodiments of acoustic imaging systems incorporating attenuation-based image resolver are described in greater detail in reference to FIGS. 4A-5B.

The foregoing description of the embodiments depicted in FIGS. 1-2, and various alternatives and variations, are presented, generally, for purposes of explanation, and to facilitate a thorough understanding of the detailed embodiments presented below. However, it will be apparent to one skilled in the art that some of the specific details presented herein may not be required in order to practice a particular described embodiment, or an equivalent thereof.

Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. For example, transducers can be arranged on the right and left of an input surface, on the top and bottom of an input surface, around a portion of an input surface, below an input surface, on an edge of an input surface (which may be curved or flat), coupled to the input surface by a waveguide, and so on. In some embodiments, the transducer arrangement can accommodate other components, ports, or parts of an associated electronic device by including gaps.

Example Acoustic Transducer Distributions

As noted above, an acoustic imaging system, whether such a system incorporates a reflection-based image resolver or an attenuation-based image resolver, is associated with multiple acoustic transducers distributed at various locations along the imaging surface. FIGS. 3A-3G depict various example distributions of acoustic transducers that may be used with an acoustic imaging system such as described herein.

Figure 3A:
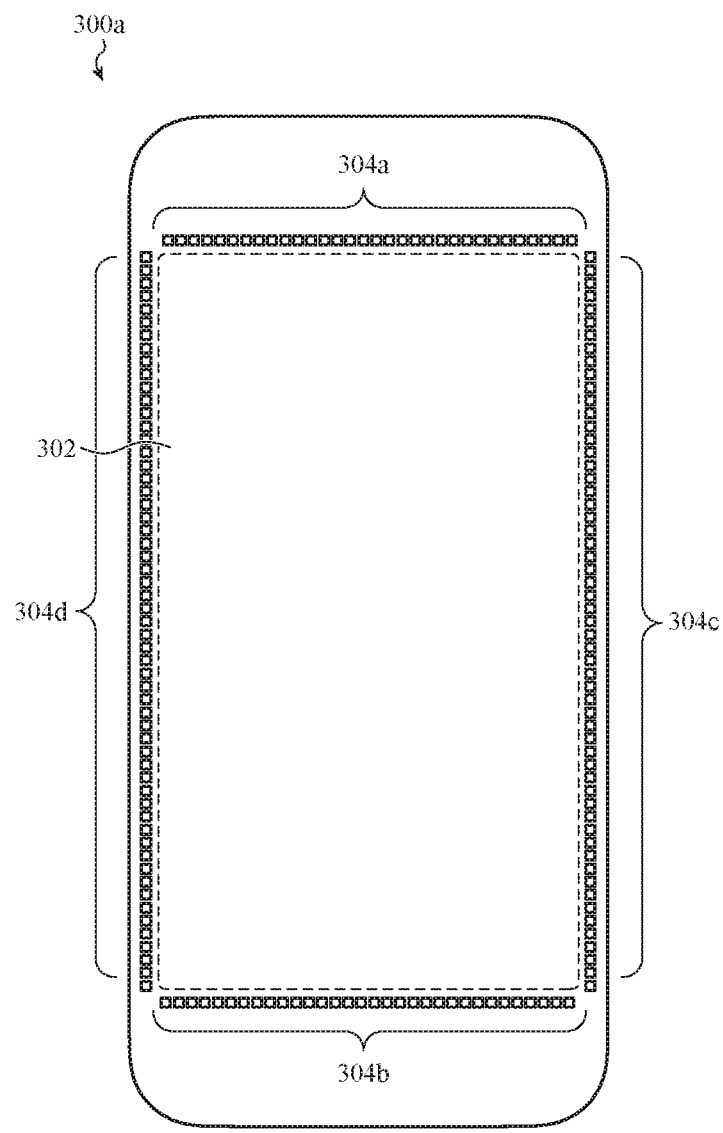
FIG. 3A depicts a distribution of acoustic transducers associated with an acoustic imaging system.

For example FIG. 3A depicts one example distribution of acoustic transducers associated with an acoustic imaging system disposed on a bottom surface of an imaging surface 300a so as to circumscribe a substantially rectangular area. The imaging surface 300a forms a portion of an external surface of an electronic device, such as the electronic device 100 depicted in FIG. 1.

The imaging surface 300a can take substantially any shape appropriate for a particular implementation. As illustrated, the imaging surface 300a is a rounded rectangle. The imaging surface 300a is formed from a rigid material such as strengthened glass or sapphire. The rigidity of the imaging surface 300a serves to protect the internal components of an electronic device onto which the imaging surface 300a is disposed. More particularly, the imaging surface 300a may be disposed over a display of the electronic device, such as the electronic device 100 depicted in FIG. 1.

A number of acoustic transducers can be distributed on the bottom surface of the imaging surface 300a. The acoustic transducers circumscribe a circumscribed portion 302. The circumscribed portion 302 is approximately equal to the area of a display that the imaging surface 300a is configured to protect. In many cases, the circumscribed portion 302 of the imaging surface 300a is transparent, whereas the remainder of the imaging surface 300a (e.g., bezel) is opaque. The opaque portions of the imaging surface 300a hide the acoustic transducers from view.

The acoustic transducers are disposed around the circumscribed portion 302 in four separate linear groups (e.g., rows and/or columns). A top edge group 304a, a bottom edge group 304b, a right edge group 304c, and a left edge group 304d.

As noted with respect to other embodiments described herein, the acoustic transducers can be formed directly onto the bottom surface of the imaging surface 300a. In other examples, the acoustic transducers can be adhered to the bottom surface of the imaging surface 300a. In yet other examples, the acoustic transducers are disposed at least partially within the imaging surface 300a.

Also as noted with respect to other embodiments described herein, the acoustic transducers can be operated in one or more modes. For example, the top edge group 304a can operate in a drive mode when the bottom edge group 304b operates in a sense mode. In another example, every acoustic transducer within, for example, the top edge group 304a alternate between drive acoustic transducers and sense acoustic transducers. In other cases, each acoustic transducer can be operated in either a drive mode or a sense mode.

Figure 3B:
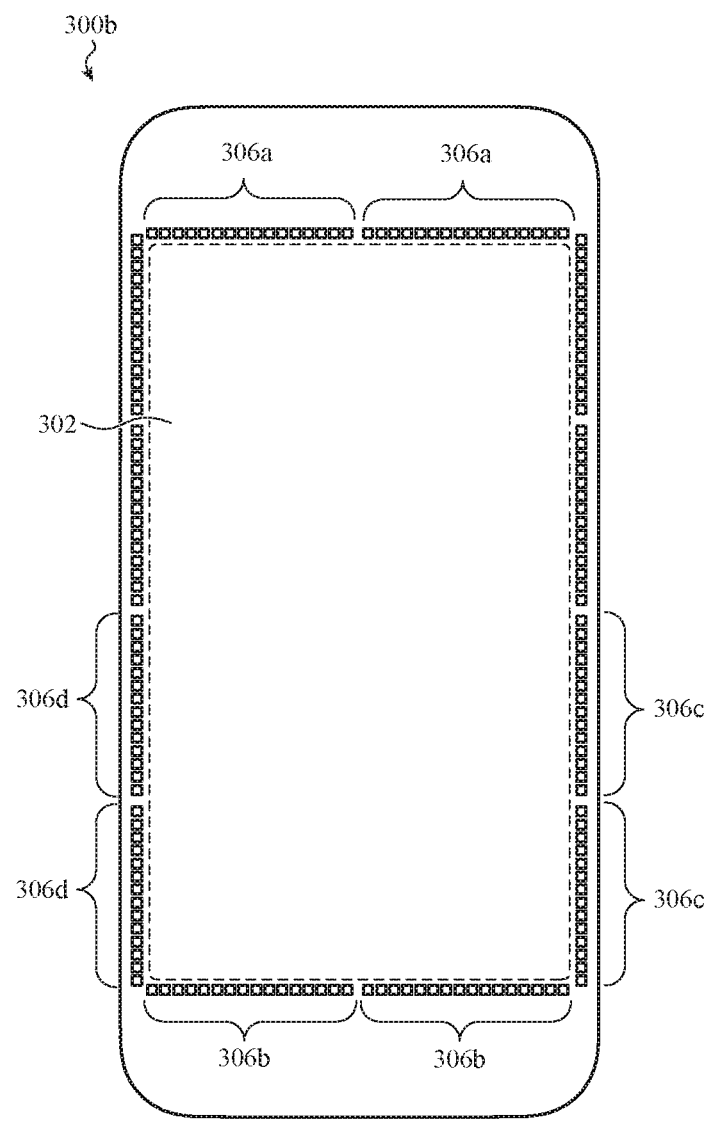
FIG. 3B depicts another distribution of acoustic transducers associated with an acoustic imaging system.

Each of the top edge group 304a, the bottom edge group 304b, the right edge group 304c, and the left edge group 304d are illustrated as a single linear distribution of acoustic transducers, such a configuration is not required. For example, as shown in FIG. 3B, each of the top edge group 304a, the bottom edge group 304b, the right edge group 304c, and the left edge group 304d may be comprised of multiple subgroups of acoustic transducers 302. Although a specific number of subgroups are illustrated, any number of subgroups may be used. In addition, each subgroup may have any number of acoustic transducers 302.

The arrangement of the acoustic transducers 302 into various subgroups enables each subgroup to operate independently. As such, routing of timing signals of each acoustic transducer (e.g., driving a first acoustic transducer, followed by a second acoustic transducer, and so on) may be limited to a particular subgroup rather than every acoustic transducer 302 that is positioned around the imaging surface 300a. In addition, a first subgroup and a third subgroup may be fired without firing a second subgroup For example, as shown in FIG. 3B, each of the top edge group 306a, the bottom edge group 306b, the right edge group 306c, and the left edge group 306d can be defined as include more than one adjacent linear distribution of acoustic transducers. In one embodiment, the outermost linear distribution of acoustic transducers may be configured to operate in a receive mode whereas the innermost linear distribution of acoustic transducers may be configured to operate in a drive mode.

Figure 3C:
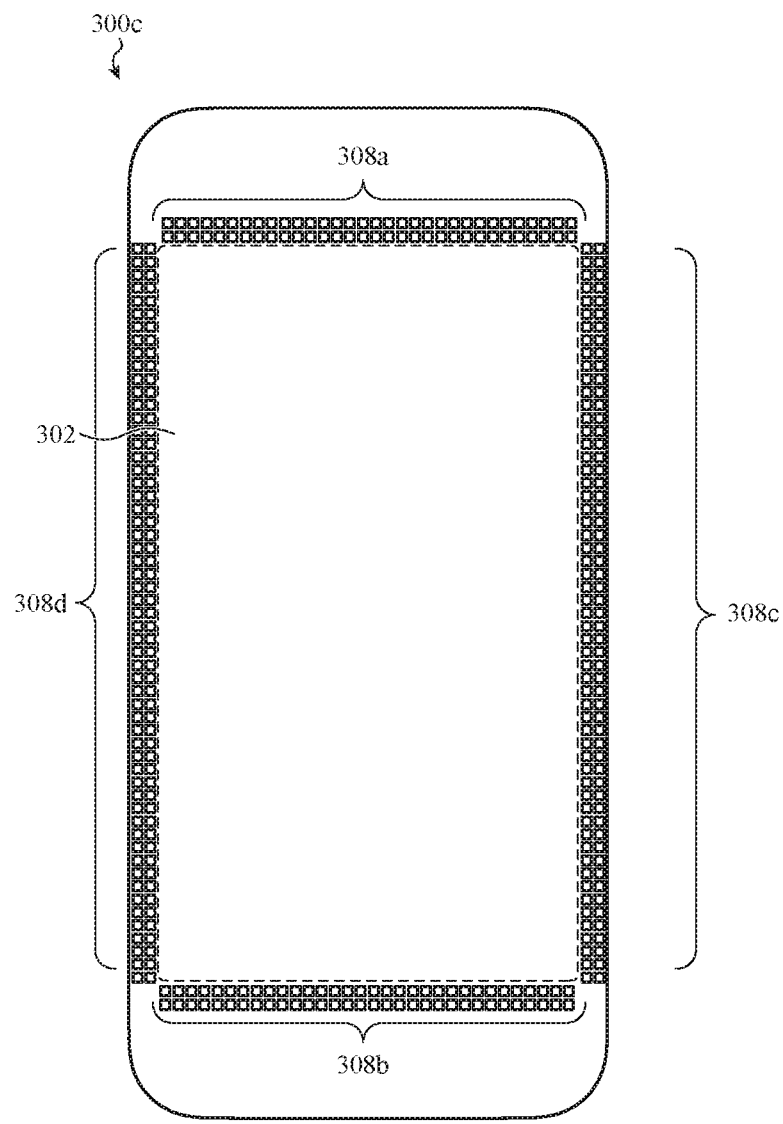
FIG. 3C depicts another distribution of acoustic transducers associated with an acoustic imaging system.

In some cases, more than one row of acoustic transducers can be used. FIG. 3C depicts each group of acoustic transducers (top edge group 308a, the bottom edge group 308b, the right edge group 308c, and the left edge group 308d) as having two adjacent linear distributions of acoustic transducers. In other embodiments, such a configuration is not required and other embodiments can include a larger number of adjacent linear distributions of acoustic transducers or a smaller number of adjacent linear distributions of acoustic transducers. In still further embodiments, linear distributions of acoustic transducers need not be aligned with one another. For example, a second linear distribution may be offset with respect to a first linear distribution.

In still other examples, groups of acoustic transducers need not include the same number of acoustic transducers, the same distributions of acoustic transducers, or the same relative alignment of acoustic transducers.

Figure 3D:
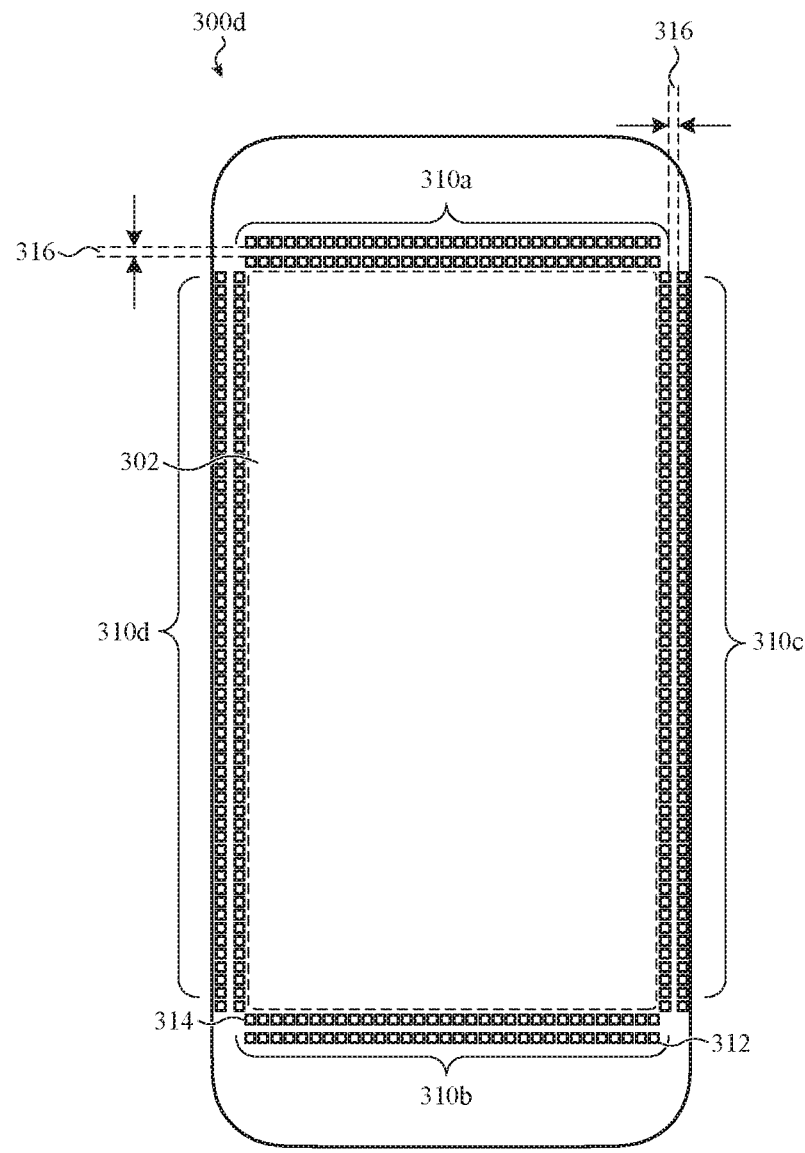
FIG. 3D depicts another distribution of acoustic transducers associated with an acoustic imaging system.

In yet another example, multiple adjacent linear distributions of acoustic transducers may be provided on an imaging surface 300d. For example, as shown in FIG. 3D, each of the top edge group 304a, the bottom edge group 304b, the right edge group 304c, and the left edge group 304d can include multiple rows and/or columns of acoustic transducers. In one embodiment, the outermost linear distribution of acoustic transducers 312 may be configured to operate in a receive mode whereas the innermost linear distribution of acoustic transducers 314 may be configured to operate in a drive mode or vice versa. In other implementations, the outermost linear distribution of acoustic transducers 312 and the innermost linear distribution of acoustic transducers 314 may both be configured to operate in a drive mode or may both be configured to operate in a sense mode.

In this particular implementation, each of the linear distributions of acoustic transducers may be separated by a space or a gap 316. The size of the gap 316, or the spacing caused by the gap 316, may be based, at least in part, on a wavelength of a wave that is transmitted from the acoustic transducers. More specifically, the gap 316 may be based on an order of a drive frequency of a wave that is transmitted from one or both of the outermost linear distribution of acoustic transducers 312 or the innermost linear distribution of the acoustic transducers 314.

For example, each linear distribution of acoustic transducers may be separated by a quarter of a given wavelength (or some other fractional amount) or may be spaced such that the wavelengths are phase shifted by approximately 90 degrees. Although specific values have been discussed, other values may be used.

In some embodiments, the gap 316 may also be based on the type of material used for the imaging surface 300d and one or more material properties (e.g., a hardness) of the imaging surface 300d. For example, a wave may travel over or through a first user input surface (e.g., sapphire) at a first speed and may travel over or through a second user input surface (e.g., glass) at a second, different speed. Thus, the gap 316 between the outermost linear distribution of acoustic transducers 312 and the innermost linear distribution of acoustic transducers 314 may be adjusted accordingly.

The gap 316 between the outermost linear distribution of acoustic transducers 312 and the innermost linear distribution of acoustic transducers 314 may also be used to demodulate the signals received by the acoustic transducers. More specifically, the spacing or the gap 316 between the outermost linear distribution of acoustic transducers 312 and the innermost linear distribution of acoustic transducers 314 is used to demodulate a received signal to find phase information and amplitude information from the signal. Because the gap 316 is known, demodulating circuitry from the analog front end, may be omitted. In other implementations, demodulating circuitry may be included but simplified as the gap 316 accounts for the phase shift of the waveforms.

More specifically, because waves generated and/or received by the innermost linear distribution of acoustic transducers 312 and the outermost linear distribution of acoustic transducers 314 are 90 degrees out of phase with respect to one another (or are effectively separated by an order of magnitude of a given wavelength, such as, for example, a quarter of a wavelength), the waveforms received are analog signals having quadrature-encoded carriers. Accordingly, summing the waveforms received by the innermost linear distribution of acoustic transducers 312 with the outermost linear distribution of acoustic transducers 314 yields a waveform that includes information corresponding to the amplitude of the received waveform. When this information is combined with other demodulated signals, an image of a user's finger may be reproduced such as described above.

In the embodiments described above, the demodulation may be I/Q demodulation. In embodiments where I/Q demodulation is used, the receive signal's information may be moved to baseband frequencies (e.g., low frequencies) and the rest of the analog front end may be implemented using low frequency requirements.

Although FIG. 3B depicts each group as having two adjacent linear distributions of acoustic transducers, such a configuration is not required. In other embodiments, larger number of adjacent linear distributions of acoustic transducers or a smaller number of adjacent linear distributions of acoustic transducers may be used.

In still further embodiments, each of the outermost linear distribution of acoustic transducers 312 and the innermost linear distribution of acoustic transducers 314 may be grouped into various subgroups such as described above. In yet other implementations, each of the linear distributions of acoustic transducers need not be aligned with one another. For example, the outermost linear distribution of acoustic transducers 312 may be offset from the innermost linear distribution of acoustic transducers 314. In still other examples, groups of acoustic transducers need not include the same number of acoustic transducers, the same distributions of acoustic transducers, or the same relative alignment of acoustic transducers.

Figure 3E:
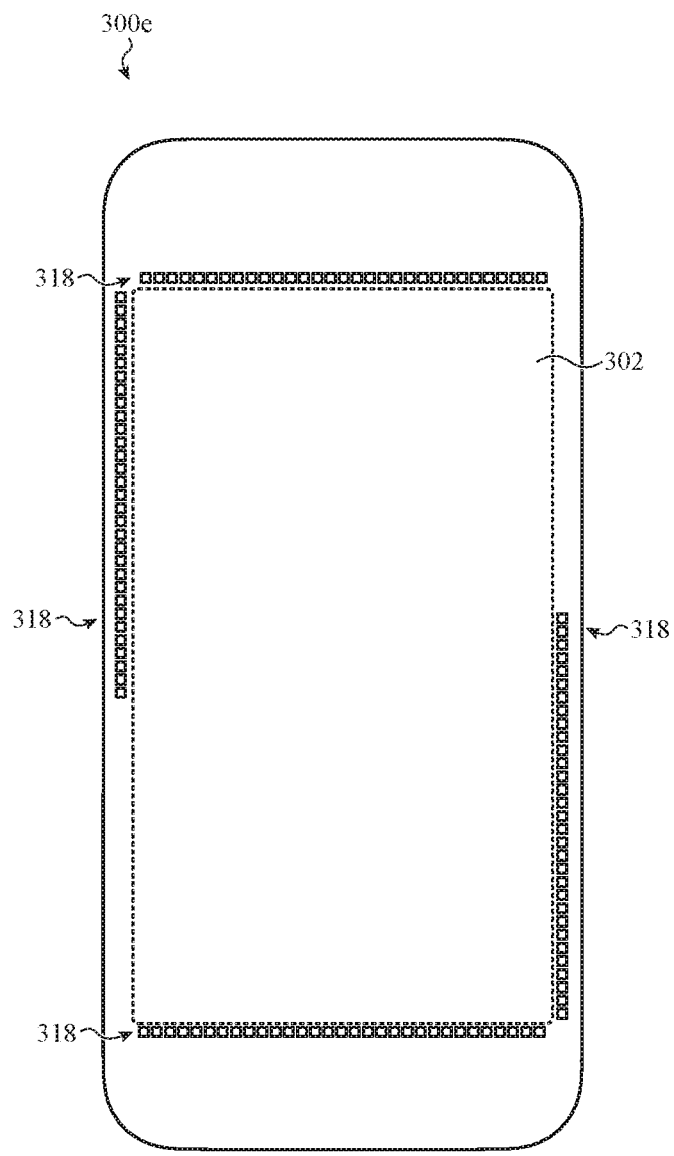
FIG. 3E depicts another distribution of acoustic transducers associated with an acoustic imaging system.

In still further examples, the acoustic transducers can be disposed over only a portion of user input surface. For example, FIG. 3E depicts another configuration of acoustic transducers, showing four arrangements or groupings of acoustic transducers 318 that generally frame, at two corners, a circumscribed portion of the user input surface. In this example, as with others described herein, the circumscribed portion may be associated with an outer protective layer of a display, such as the display 104 depicted in FIG. 1.

Figure 3F:
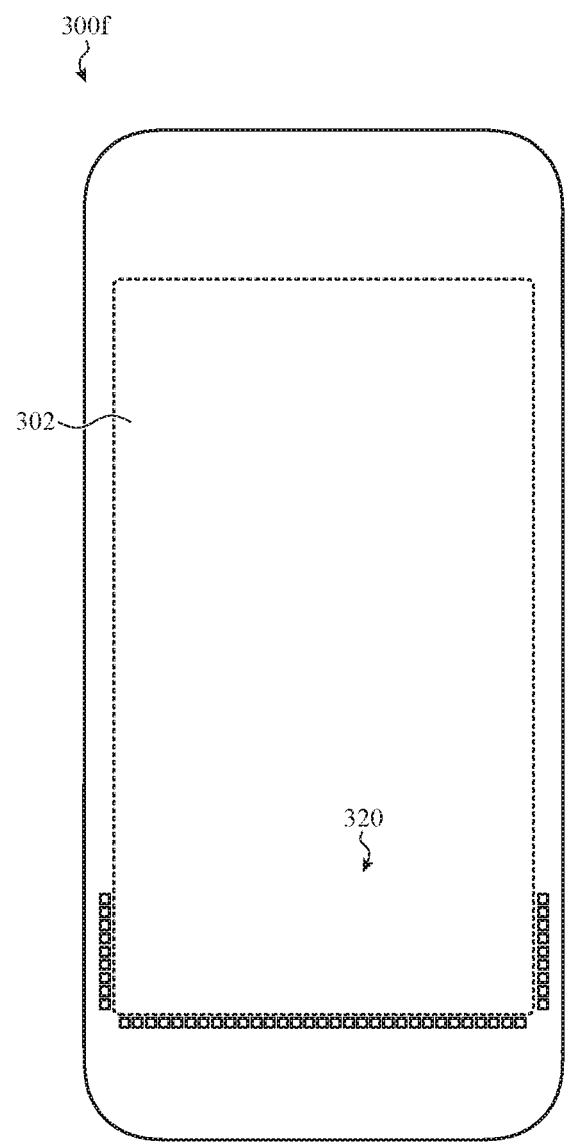
FIG. 3F depicts another distribution of acoustic transducers associated with an acoustic imaging system.
Figure 3G:
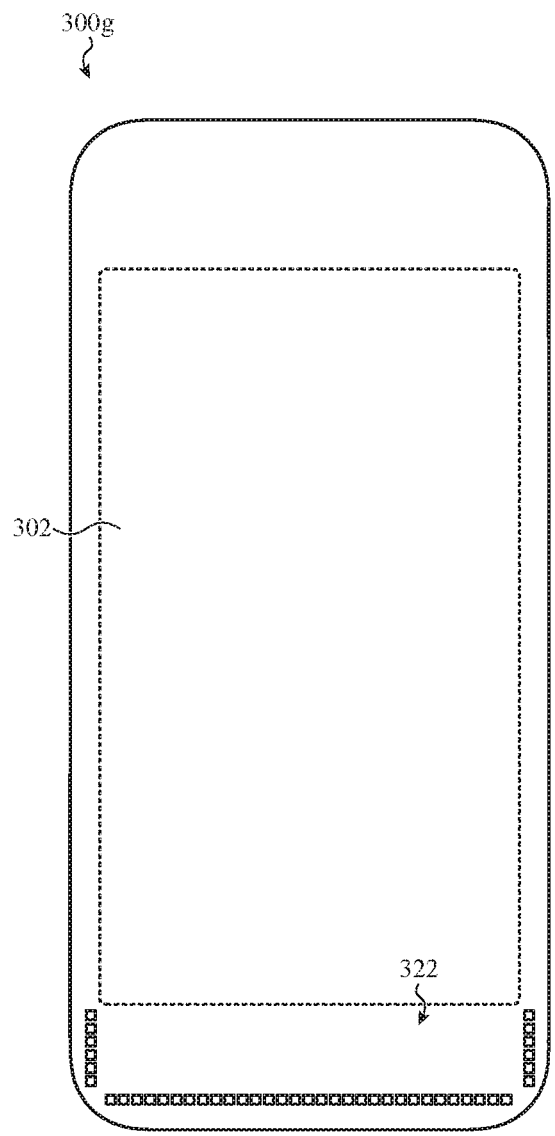
FIG. 3G depicts another distribution of acoustic transducers associated with an acoustic imaging system.

In still further examples, the acoustic transducers can be disposed over only a portion of the user input surface, such as shown in FIG. 3F. In this embodiment, the acoustic transducers form a bucket shape 320 along a bottom portion of a circumscribed portion of the user input surface. In this example, as with others described herein, the circumscribed portion that may be associated with an outer protective layer of a display, such as the display 104 depicted in FIG. 1.

In still further examples, the acoustic transducers can be disposed over a portion of the user input surface that is not associated with a display, such as shown in FIG. 3F. In this embodiment, the acoustic transducers form a bucket shape 322 below a bottom portion of a circumscribed portion of the user input surface. In this example, as with others described herein, the circumscribed portion that may be associated with an outer protective layer of a display, such as the display 104 depicted in FIG. 1.

The foregoing description of the embodiments depicted in FIGS. 3A-3H, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof. Thus, the foregoing and following descriptions of specific embodiments are presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings.

For example, the manner in which an acoustic transducer or a group of acoustic transducers is coupled to the imaging surface may vary from embodiment to embodiment. In some cases, an acoustic transducer is directly coupled to an underside of the imaging surface via an adhesive. The adhesive is typically a rigid adhesive, but this may not be required of all embodiments. In some cases, an electrode associated with an acoustic transducer interposes the transducer and the underside of the imaging surface.

In some cases, acoustic transducers can share one or more electrodes. The shared electrode can be a ground electrode, although this configuration is not required and can be a signal and/or power supply electrode instead. In some cases, each acoustic transducer associated with a shared electrode can be made from the same material, although this is not required; in some embodiments, different acoustic transducers can be made from different materials.

In some embodiments, the independent acoustic transducers can be coupled to the shared electrode by soldering. In some embodiments, the shared electrode can be formed, layered, or otherwise disposed atop the independent acoustic transducers in a manufacturing process. In some cases, the shared electronic can be an optically transparent electrode, formed from a material such as indium tin oxide or metal nanowire. In further embodiments, the independent acoustic transducers can be coupled to the shared electrode by an electrically conductive adhesive.

In many examples, a series of individual electrodes electrically couple independent acoustic transducers to a combined sense and drive chip. The individual electrodes, the independent acoustic transducers, and the send/drive chip are positioned adjacent to a bottom surface of the imaging surface and are coupled to a lower surface of the shared electrode.

The combined sense and drive chip may be understood as the controller of other embodiments described and depicted herein, such as the controller depicted in FIG. 2. The combined sense and drive chip can be implemented as a circuit, as an integrated circuit, analog circuit, or as any combination thereof.

In some examples, the combined sense and drive chip can be configured for both high voltage operation and low voltage operation, although such a configuration is not required of all embodiments. For example, in one embodiment, the combined sense and drive chip is configured for high voltage driving of the independent acoustic transducers and low voltage sensing of the independent acoustic transducers. In another embodiment, the combined sense and drive chip is configured for low voltage driving and low voltage sensing. In still further embodiments, the combined sense and drive chip is configured for both high voltage drive and high voltage sense.

In this manner, in some embodiments, the combined sense and drive chip can be manufactured with both high-voltage-tolerant components and low-voltage-tolerant components. In many cases, low-voltage-tolerant components may be more sensitive to low voltage signals but may be damaged by high voltage signals. High-voltage-tolerant components may be less sensitive to low voltage signals (e.g., small changes in voltage), and therefore more sensitive to noise. As such, low-voltage-tolerant components may exhibit better performance for receiving signals whereas high-voltage-tolerant components may exhibit better performance for driving transducers.

In such embodiments, the low-voltage-tolerant components can be protected from damage caused by high voltage using one or more isolation and/or voltage biasing methods. For example, in one embodiment, low-voltage-tolerant components can be physically isolated from high voltage via one or more switches enabled while high-voltage-tolerant components are operating. In another embodiment, a ground node of the low-voltage-tolerant components can be biased upwardly while high-voltage-tolerant components are operating such that the potential difference between the low-voltage-tolerant components' ground and the high voltage required by the high-voltage-tolerant components is within the tolerance range of the low-voltage-tolerant components. Such a process is generally referred to herein as "ground shifting" of low-voltage-tolerant components.

When operating in a drive mode, the combined sense and drive chip can provide a high voltage signal to one or more of the independent electrodes which can, in turn, excite the respective one or more independent acoustic transducers. In this mode, the largest potential difference between the combined sense and drive chip and the shared electrode can be a high voltage. During this operation, low-voltage-tolerant components within the combined sense and drive chip can be ground shifted. In this manner, the largest potential difference across low-voltage-tolerant components within the combined sense and drive chip can be 3.3 volts (as one example). In many cases, the combined sense and drive chip can include one or more sense and drive circuits dedicated to each independent acoustic transducer.

In other cases, a combination combined sense and drive chip may not be required. In such embodiments, individual acoustic transducers couple through the independent electrodes directly to a sense chip. The individual acoustic transducers couple through the shared electrode directly to a drive chip. In these examples, individual acoustic transducers can be driven as a group and read individually. Such an embodiment can employ—should it be required by a particular implementation—ground shifting, isolation, or any other suitable means to protect low-voltage-tolerant components within the sense chip from the high voltage generated during operation of the drive chip.

Still other embodiments are implemented in another manner. For example, a series of drive-mode acoustic transducers can be separated from a corresponding series of sense-mode acoustic transducers. In this embodiment, the drive-mode acoustic transducers and the sense-mode acoustic transducers are coupled to the imaging surface via the shared electrode. The drive-mode acoustic transducers are coupled to a drive chip and the sense-mode acoustic transducers are coupled to a sense chip. The drive chip and the sense chip may be positioned adjacent to one another, although this may not be required. In another embodiment, the drive chip and the sense chip can be different subcomponents or submodules of a single integrated circuit.

Still other embodiments are implemented in another manner. For example a drive acoustic transducer can be disposed over (e.g., vertically stacked) several sense-mode acoustic transducers, identified as the sense-mode acoustic transducers. In some embodiments, the drive acoustic transducer is formed from the same material as the sense-mode acoustic transducers, although this is not required. The drive acoustic transducer is coupled to the sense-mode acoustic transducers by a common electrode. The sense-mode acoustic transducers can be coupled to a sense chip via individual electrodes. The drive acoustic transducer can be coupled to a drive chip. The sense chip and the drive chip can each be implemented as a circuit, as an integrated circuit, an analog circuit, an analog/mixed signal circuit, or as any combination thereof. In other cases, sense-mode acoustic transducers can be stacked above the drive-mode acoustic transducer.

As a result of this topology (including separate drive acoustic transducers and sense acoustic transducers), the sense-mode acoustic transducers can operate separately from the drive-mode acoustic transducer. As a result, the sense-mode acoustic transducers can begin receiving the moment the drive-mode acoustic transducer is driven by the drive chip.

Still other embodiments are implemented in another manner. For example a several drive-mode acoustic transducers can be disposed over (e.g., vertically stacked) several sense-mode acoustic transducers. As with other embodiments described herein, the drive-mode acoustic transducers may be the same material or may be a different material from the sense-mode acoustic transducers. In this embodiment, the drive-mode acoustic transducers are coupled to the sense-mode acoustic transducers by a common electrode. In other embodiments, a common electrode is not required; individual electrodes can couple the drive-mode acoustic transducers to the sense mode acoustic transducers. The sense-mode acoustic transducers can be coupled to a sense chip via individual electrodes. The drive acoustic transducer can be coupled to a drive chip via individual electrodes. The sense chip and the drive chip can each be implemented as a circuit, as an integrated circuit, an analog circuit, an analog/mixed signal circuit, or as any combination thereof. In other cases, the sense-mode acoustic transducers can be stacked above the drive-mode acoustic transducers.

As a result of this topology, and as with other embodiments described herein, the sense-mode acoustic transducers can operate separately from the drive-mode acoustic transducer. As a result, the sense-mode acoustic transducers can begin receiving the moment the drive-mode acoustic transducer is driven by the drive chip.

Still other embodiments are implemented in another manner. For example, a single drive-mode acoustic transducer sheet can be disposed over (e.g., vertically stacked) several sense-mode acoustic transducers, identified as the sense-mode acoustic transducers. As with other embodiments described herein, the drive-mode acoustic transducer may be the same material or may be a different material from the sense-mode acoustic transducers. The drive-mode acoustic transducer can be a single acoustic transducer or may be made up of a series of individual acoustic transducers.

In many cases, the drive-mode acoustic transducer is formed from a material selected for drive-mode power efficiency whereas the sense-mode acoustic transducers can be formed from a material selected for sense-mode power efficiency (e.g., PVDF).

In one embodiment, the drive-mode acoustic transducer is formed from one of a bulk PZT or a piezocomposite material. In some cases, a piezocomposite material (layers of piezoelectric materials separated by adhesive or epoxy) may be selected to increase the bandwidth of the drive-mode acoustic transducer relative to a particular fundamental drive frequency. An increased drive bandwidth can increase the signal to noise ratio (e.g., reduced ringing).

In another embodiment, the drive-mode acoustic transducer includes a backing. The backing may be a low-durometer adhesive or other resilient material. The backing can couple the drive-mode acoustic transducer to another component, such as a supporting plate or frame. The backing serves to reduce and absorb reflections of the drive waveform that may reflect within the drive-mode acoustic transducer as a result of an acoustic impedance mismatch between the drive-mode acoustic transducer and the imaging surface, or the shared electrode.

In certain embodiments, the drive-mode acoustic transducers are coupled to the sense-mode acoustic transducers by a common electrode. In other embodiments, a common electrode is not required; individual electrodes can couple the drive-mode acoustic transducers to the sense mode acoustic transducers. The sense-mode acoustic transducers can be coupled to a sense chip via individual electrodes. The drive acoustic transducer can be coupled to a drive chip via individual electrodes. The sense chip and the drive chip can each be implemented as a circuit, as an integrated circuit, an analog circuit, or as any combination thereof.

In other cases, the sense-mode acoustic transducers can be stacked above the drive-mode acoustic transducers. In this embodiment, the drive chip, which may operate at high voltage, is separated and isolated from the sense chip, which may operate at low voltage. The common electrode can be a ground reference for both the sense chip and the drive chip. As a result of this topology, and as with other embodiments described herein, the sense-mode acoustic transducers can operate separately from the drive-mode acoustic transducer. As a result, the sense-mode acoustic transducers can begin receiving the moment the drive-mode acoustic transducer is driven by the drive chip.

The foregoing embodiments described above related to acoustic transducers and drive chips and sense chips, and the various alternatives thereof and variations thereto are presented, generally, for purposes of explanation, and to facilitate an understanding of various possible acoustic imaging system topologies. More specifically, these embodiments are presented to illustrate that acoustic transducers of an acoustic imaging system such as described herein can be configured to operate in both a drive mode and a sense mode, can be configured to operate in one of a drive mode or a sense mode, can be configured to operate in one of a drive mode or a sense mode. Further, the depicted embodiments are provided to facilitate an understanding that drive acoustic transducers may share one or more electrodes with sense electrodes, drive electrodes and sense electrodes may be formed from the same or different material, drive and sense electrodes may be segmented (e.g., pixelated) or unitary, drive or sense electrodes can be operated from the same silicon or from different silicon, drive chips can be integrated with or can be separate from sense chips, and so on. As such, it may be appreciated that these embodiments are not intended to be exhaustive of all possible combinations, layouts, or topologies of drive electrodes, sense electrodes, drive acoustic transducers, sense acoustic transducers, multi-modal acoustic transducers, drive chips, sense chips, multimodal chips, and so on. Instead, the depicted examples are understood to be merely a subset of the representative embodiments of an acoustic imaging system such as described herein that may be implemented within the spirit and scope of this disclosure.

In still further embodiments, one or more acoustic transducers can be capacitively driven. In these examples, individual electrodes are separated from independent acoustic transducers by a dielectric material. In these examples, the dielectric material is disposed to encapsulate the independent electrodes. In some cases, the dielectric material may be an adhesive, a layer deposited via vapor deposition, an epoxy, or any other suitable layer. In many embodiments, the dielectric material has a high dielectric constant and is disposed as a thin layer.

As a result of this configuration, the individual electrodes each form a capacitor with one respective acoustic transducer. As a result, the operation of driving the acoustic transducers can be modeled as a circuit including a capacitor having a very large capacitance inserted between a voltage source (e.g., drive chip) and an acoustic transducer (e.g., individual acoustic transducer). Similarly, the operation of reading the acoustic transducers can be modeled as a circuit including a capacitor having a very large capacitance inserted between a voltage source (e.g., individual acoustic transducer) and a sense circuit (e.g., sense chip). As may be appreciated, such a configuration can be more easily and efficiently manufactured at scale; precise alignment and precise electrical connection between electrodes and acoustic transducers may not be required.

In still further embodiments, either or both the drive chip and/or the sense chip may be implemented as a series of interconnected analog or digital circuits that are each associated with an individual acoustic transducer or a group of individual transducers. Such embodiments are referred to herein as acoustic imaging systems incorporating "distributed controllers."

More specifically, a distributed controller is implemented as a series of subgroup controllers, one of which is labeled as the subgroup controller and the master controller. The series of subgroup controllers can be communicably coupled to the master controller in a hub-and-spoke configuration, although this is not required.

In this example, the subgroup controller is associated with a subgroup of transistors nearby or adjacent to the subgroup controller. Similarly, other subgroup controllers of the series of subgroup controllers are each associated with a respective one subgroup of acoustic transducers. More specifically, the subgroup controller may be purpose-configured to drive and/or read only certain acoustic transducers of the acoustic imaging system.

In this example, the master controller couples to, and coordinates the actions of, each subgroup controller of the series of subgroup controllers, including the subgroup controller.

A subgroup controller can be implemented in any number of suitable ways. In certain embodiments, a subgroup controller can be implemented as a combination of individual purpose-configured circuits that are, directly or indirectly, communicably coupled to one another. In one embodiment, a series of acoustic transducers are coupled, via a common electrode, to the underside of the imaging surface. An opposite side of the series of acoustic transducers is coupled, via a series of electrical contacts (or via capacitive signaling through a dielectric material, to a first section of the subgroup controller.

In many examples, the first section can include one or more analog or digital circuits configured to facilitate driving or sensing of the series of the acoustic transducers. For example, in one embodiment, the first section is a thin-film transistor imaging surface strip that includes at least one amplification stage. The amplification stage can serve as a pre-amp for signals obtained when reading one or more of the series of acoustic transducers. In this example, the first section can be manufactured in a time and cost-efficient manner.

In another example, the first section can be made from a flexible circuit. The flexible circuit can include at least one amplification stage such as described above. In other cases, other circuits and/or purpose configured circuit topologies can be included such as, but not limited to: addressing circuits (e.g., shift registers), power control or regulation circuits, drive circuits, switch circuits, filtering circuits, multi-stage amplification circuits, analog-to-digital conversion stages and/or circuits, encryption and/or decryption circuits, compression circuits, data streaming or protocol conformity circuits, and so on. In still further embodiments, the first section may be implemented without circuitry; the first section may be a passive interposer.

In certain embodiments, the first section can couple, via an interposer (or other suitable connection) to a second section. The second section can be an integrated circuit that is purpose-configured for driving and/or reading the series of acoustic transducers via the first section. In this manner, by separating certain functions of the subgroup controller into a first section and a second section manufacturing and signal processing efficiency can be improved. As with the first section, the second section can include other circuits and/or purpose configured circuit topologies can be included such as, but not limited to: addressing circuits (e.g., shift registers), power consumption regulation circuits, drive circuits, switch circuits, filtering circuits, multi-stage amplification circuits, analog-to-digital conversion stages and/or circuits, encryption and/or decryption circuits, compression circuits, data streaming or protocol conformity circuits, and so on.

The foregoing embodiments and the various alternatives thereof and variations thereto are presented, generally, for purposes of explanation, and to facilitate an understanding of various possible methods for dividing and/or distributing the processing and/or signal conditioning load of an acoustic imaging system such as described herein. Instead, the depicted examples are understood to be merely a subset of the representative embodiments of an acoustic imaging system such as described herein that may be implemented within the spirit and scope of this disclosure.

Example Operation of an Attenuation-Based Image Resolver

Generally and broadly, FIGS. 4A-5B reference a transmission tomography acoustic imaging system 400 incorporating an attenuation-based image resolver (not shown).

The transmission tomography acoustic imaging system 400 is configured to drive one or more acoustic transducers 402 and, thereafter to obtain multiple planar projections, each taken at a different angle, of a contact area 404 determined by a touch sensor (such as the touch sensor depicted in FIG. 2).

Once the transmission tomography acoustic imaging system 400 obtains a sufficient number of planar projections (the number and angles of which may vary from embodiment to embodiment), the system may estimate or approximate the acoustic attenuation map 406 (e.g., the inverse Radon transform) of the contact area 404 using any suitable method. Once estimated, the acoustic attenuation map 406 can serve as a direct proxy for the fingerprint of a user.

Initially, reference is made to the operation of the controller of the transmission tomography acoustic imaging system 400 when in the transmission mode. When in the transmission mode, the controller propagates the acoustic pulse 408 (typically of uniform magnitude) through the user input surface in the direction of the contact area 404 determined by a touch sensor (e.g., the touch sensor depicted in FIG. 2). The acoustic pulse 408 can have any suitable wavefront shape although in many embodiments, the wavefront takes a linear shape perpendicular to the direction D along which the controller propagates the acoustic pulse 408.

Once the acoustic pulse 408 reaches the contact area 404, portions of the acoustic pulse 408 are progressively attenuated by the various features of the object in contact with the surface thereof, such as the ridges of a user's fingerprint. In other words, portions of the acoustic pulse 408 are progressively attenuated by an amount defined by unknown function that is based on the local attenuation coefficient(s) of each point through which that particular portion of the acoustic pulse 408 passes. After passing through the contact area 404, the acoustic pulse 408 no longer exhibits uniform magnitude; in the illustrated embodiment the portion of the acoustic pulse 408 that has passed through the contact area 404 is identified as the acoustic pulse 408'.

The amount of total attenuation in the acoustic pulse 408' is a function of the acoustic attenuation map 406 that the topographic acoustic imaging system seeks to estimate. In this manner, the amplitude of a particular portion of the acoustic pulse 408', is equal to the solution of a line integral of the acoustic attenuation map 406 that is defined along the linear path taken by that portion of the acoustic pulse 408.

In another non-limiting phrasing, the aggregate effect of the cumulative attenuation provided by a particular path through the contact area 404 can be mathematically modeled as the solution of a line integral (see, e.g., the line integral 412 shown in FIG. 4B) of the acoustic attenuation map 406 $f_m(x,y)$ of the contract area, the line integral defined over a line that follows the selected path. In many embodiments, the line may be defined using the Hessian normal form (e.g., $x \cos(\theta) + y \sin(\theta) - r = 0$) to ensure that the line equation is defined for all possible values of the slope of that line, particularly to ensure that the line equation is defined when the slope of the line is infinite (e.g., $$\theta = \frac{\pi}{2}, \theta = \frac{3\pi}{2})$$

For example, the line integral may be defined over a straight line angled at angle $\theta$ and offset by a perpendicular distance r from the geometric center 410 of the contact area 404. In this manner, the aggregate effect of the of the cumulative attenuation provided by the contact area 404 to the acoustic pulse 408 traversing the same can be modeled mathematically by a function such as:

$$p(r,\theta) = \iint_{-\infty}^{\infty} f_m(x,y) \delta(x \cos(\theta) + y \sin(\theta) - r) dx\, dy \quad \text{Equation 2}$$

As may be appreciated, the model presented above by Equation 2 is typically referred to as the Radon transform of the acoustic attenuation map 406 $f_m(x,y)$ of the contact area 404. In some examples, Equation 2 may be solved analytically with a sufficient number of values for r and $\theta$.

For embodiments in which the controller induces the acoustic pulse 408 exhibiting a planar wavefront, the set of line integrals represents a planar projection of the contact area 404 taken along an angle equal to the propagation direction D of the acoustic pulse 408. This is due to the fact that a planar wavefront can be mathematically modeled as a series of parallel rays.

Alternatively, for other embodiments in which the controller induces the acoustic pulse 408 having a non-planar wavefront (e.g., point source, phase-encoded point sources, and so on), the set of line integrals may be spatially filtered, linearized, combined with other sets of line integrals, or otherwise processed using appropriate techniques in order to obtain a planar projection of the contact area 404 taken along an angle equal to the propagation direction D of the acoustic pulse 408. For example, in one embodiment, the controller may propagate phase-encoded acoustic pulses from multiple single point sources. Thereafter, the controller can demodulate and de-code the set of line integrals associated with each point source and combine line integrals with one another (e.g., parallel ray matching) as necessary.

As noted above, the transmission tomography acoustic imaging system 400 may be configured to obtain a number of individual planar projections of the contact area 404, each at a different angle. Typically, these planar projections may be taken at regular angular intervals but this is not required for all embodiments.

As noted above, once the transmission tomography acoustic imaging system 400 obtains a sufficient number of planar projections (the number and angles of which may vary from embodiment to embodiment), the system may estimate the inverse Radon transform thereof which, as noted above, corresponds to the acoustic attenuation map 406.

In one example, the inverse Radon transform may be determined analytically by solving Equation 2. In other examples the inverse Radon transform may be estimated using any suitable discrete or continuous time method. For example, in one embodiment, the transmission tomography acoustic imaging system 400 employs a back projection technique that re-projects (e.g., back-projects) each planar projection back over the contact area 404, additively overlapping each of back projections over one another. The points of the resulting overlapped image correspond to the attenuation effects provided by the features of the user's fingerprint at those locations; the greater the number of planar projections, the greater the resolution, contrast, and/or clarity of the acoustic attenuation map 406.

In further embodiments, and as noted above, the transmission tomography acoustic imaging system 400 applies a high pass filter to one or more of the planar projections in order to further increase the resolution, contrast, and/or clarity of the acoustic attenuation map 406. In many cases, the high pass filter may be a ramp filter (e.g., a high-pass, compensatory filter that mitigates or eliminates DC output bias, and that is configured to attenuation low frequencies and to amplify high frequencies up to a cutoff frequency).

Figure 4A:
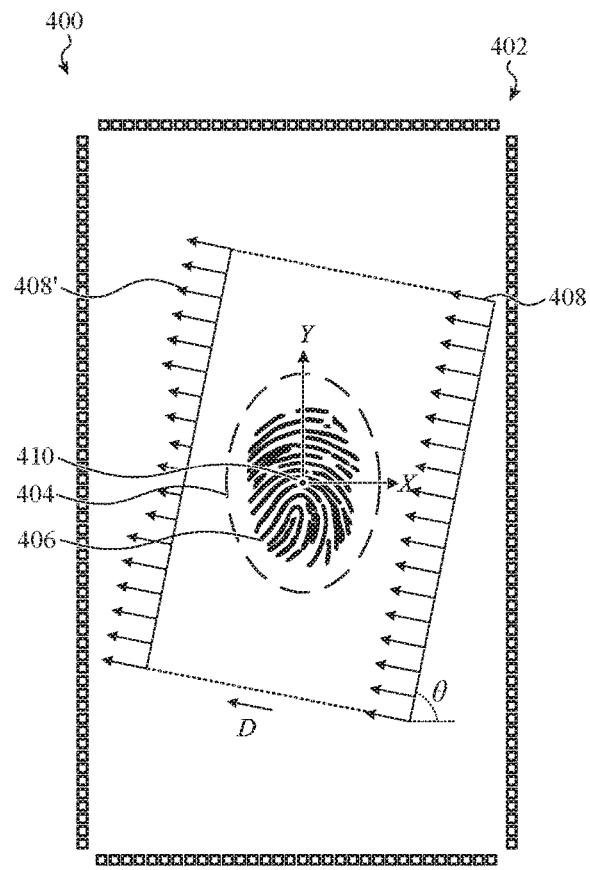
FIG. 4A depicts an acoustic imaging system such as described herein, particularly illustrating a planar wavefront traversing an imaging surface at an angle relative to a horizontal axis of the imaging surface.
Figure 4B:
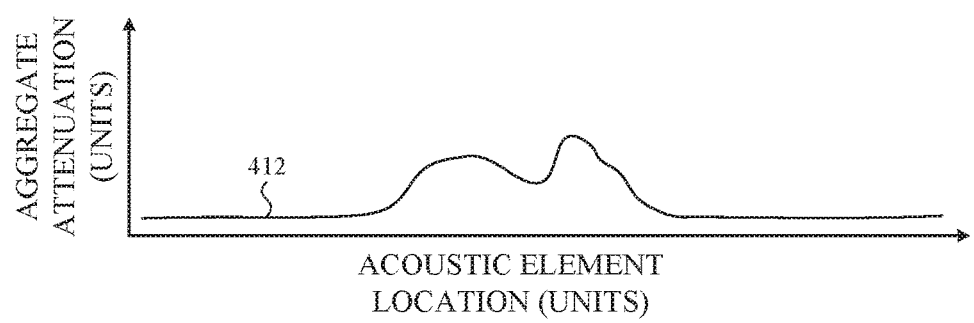
FIG. 4B is a graphical representation of the planar wavefront of FIG. 4A, particularly illustrating local attenuation of the wavefront after the wavefront is affected by the object in contact with the imaging surface.

The foregoing description of the embodiments depicted in FIGS. 4A-4B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof. Thus, the foregoing and following descriptions of specific embodiments are presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings.

Particularly, it may be understood that the transmission tomography acoustic imaging system depicted in FIGS. 4A-4B can be implemented in a number of suitable and implementation-specific ways. However, broadly and generally, the transmission tomography acoustic imaging system determines and/or estimates an acoustic attenuation map 406 of the contact area 404 and/or changes therein over time, to obtain an image of a user's fingerprint. The transmission tomography acoustic imaging system performs these operations by sending an acoustic pulse 408 at an angle toward the contact area 404 and measuring the portions of that acoustic pulse 408 that are attenuated by the contact area 404 (e.g., features of the user's fingertip that are in contact with the surface of the contact area 404). The measured portions of the acoustic pulse 408 that are attenuated by the contact area 404 can be treated as a planar projection of the contact area 404 onto a plane orthogonal to the contact area 404, taken at the angle at which the acoustic pulse 408 was propagated toward the contact area 404. These operations are repeated until a sufficient number of parallel projections of the contact area 404 are obtained. Thereafter, the parallel projections are combined using, in one example, a filtered back projection technique.

Any of these operations, or portions of these operations, may be performed by the controller of FIG. 2, by the image resolver 206 of FIG. 2, by the touch sensor of FIG. 2, and/or performed, at least in part, as a result of cooperation and communication therebetween. In other words, the example components of the transmission tomography acoustic imaging system depicted in FIG. 2 may be independently or cooperatively configured, adapted, or otherwise implemented to perform, coordinate, or monitor any number of suitable operations of the transmission tomography acoustic imaging system described above.

For example, an appropriately configured controller (in the transmission mode) can induce an acoustic pulse (e.g., the acoustic pulse 408) in any suitable manner. In one example, the controller drives the acoustic transducers 402 with a single pulse, a chirp signal, or several periods of a sinusoidal signal in order to produce the acoustic pulse 408, an acoustic chirp, or a monochromatic acoustic signal within the imaging surface, respectively.

Additionally, the controller can shape the acoustic pulse 408 in any suitable manner. For example, the controller can be configured to generate the acoustic pulse 408 such that the acoustic pulse 408 exhibits a wavefront that takes a particular shape. For example, a longitudinal acoustic pulse 408 may exhibit a planar wavefront, whereas an omnidirectional acoustic pulse 408 may exhibit a circular or curved wavefront. Other acoustic pulses can exhibit other wavefront shapes. The controller can employ beam-forming techniques in order to shape the wavefront of a particular acoustic pulse 408 into any suitable or implementation-specific shape.

Additionally, an appropriately-configured controller can cause the acoustic pulse 408 to propagate in any suitable direction. The controller can employ beam-forming techniques in order to direct the wavefront of a particular acoustic pulse 408 to propagate along a particular direction.

Thus, generally and broadly, the controller can induce any suitable acoustic pulse 408, exhibiting any suitable wavefront shape, that propagates along any suitable direction. In one example, the controller is configured to induce a monochromatic acoustic pulse 408 that exhibits a substantially planar wavefront directed toward the geometric center 408 of the contact area 404.

Once the controller (in the transmission mode) has induced a suitable acoustic pulse 408 into the imaging surface that is directed toward the contact area 404, the controller can transition into the receiving mode. In a receiving mode, the controller couples to one or more acoustic transducers, sampling electrical signals generated thereby over a period of time. In many cases, the controller transitions to the receiving mode immediately after generating the acoustic pulse 408 in the transmission mode. As noted above, the electrical signals collected by the controller can correspond to planar projections of the contact area 404.

Similarly, an appropriately configured contact sensor can be configured to determine the area over which an object, such as a fingertip, physically contacts the imaging surface.

Figure 5A:
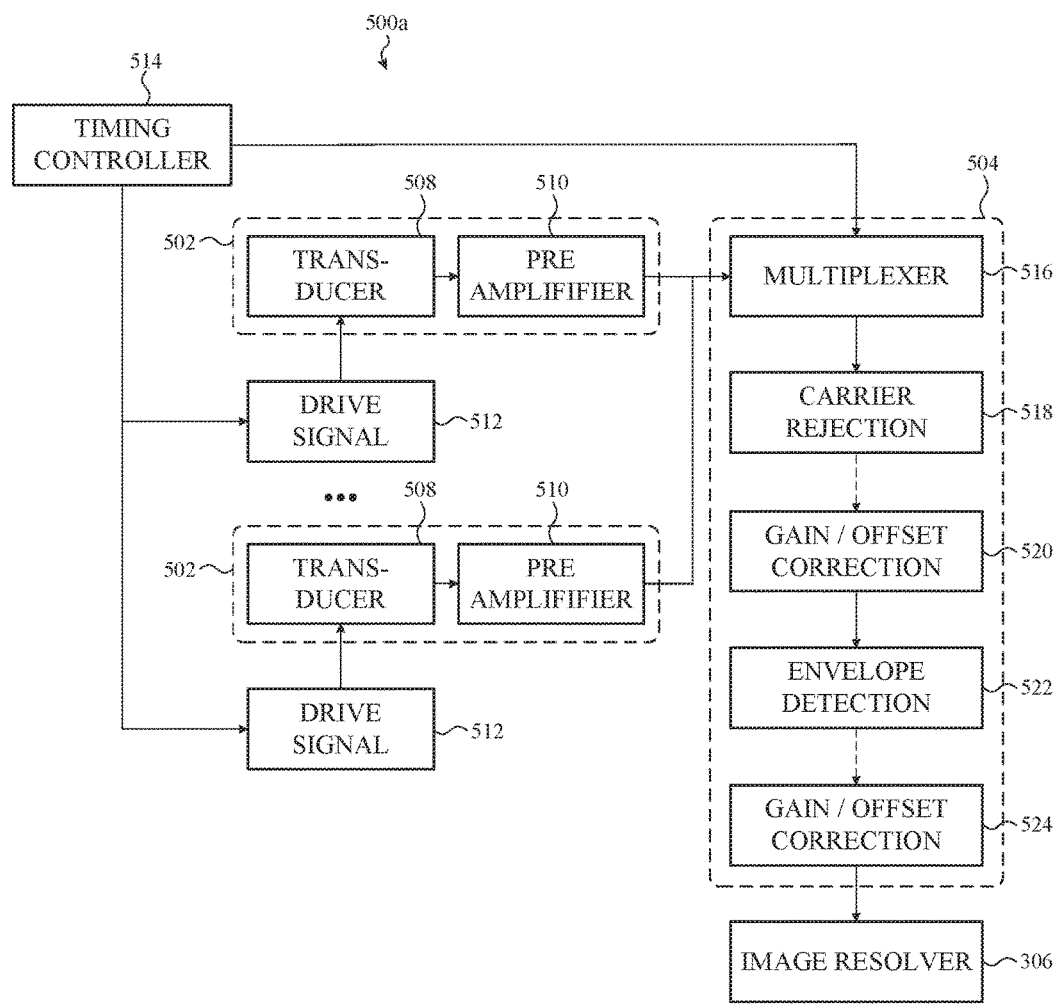
FIG. 5A depicts a simplified block diagram of an acoustic imaging system operating according to a method of transmission-based tomographic image reconstruction.
Figure 5B:
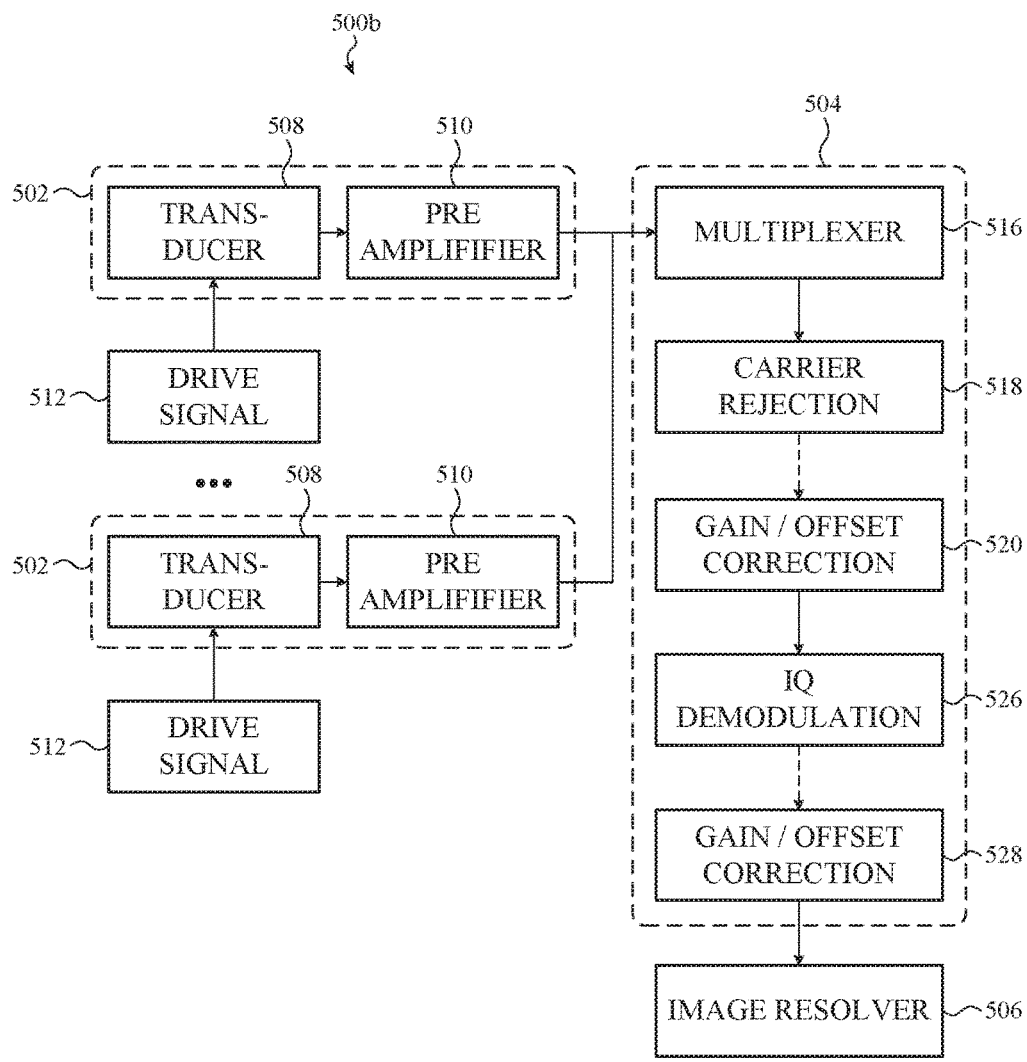
FIG. 5B depicts a simplified block diagram of an acoustic imaging system operating according to a method of diffraction-based tomographic image reconstruction.

FIGS. 5A-5B generally and broadly depict simplified block diagrams of two example transmission tomography acoustic imaging systems that may be configured and/or configurable to obtain an estimation of an acoustic attenuation map of a contact area of an imaging surface.

FIG. 5A depicts a simplified block diagram of a transmission tomography acoustic imaging system configured for employing transmission-based tomographic reconstruction techniques. As with other embodiments described herein, the transmission tomography acoustic imaging system 500a includes several acoustic transducers 502 that are coupled to a controller 504 which, in turn, is coupled to an image resolver 506.

Each acoustic transducer 502 can include an acoustic transducer 506 and a pre-amplifier 510. The acoustic transducer 506 can be formed from a piezoelectric material. The pre-amplifier 510, in many examples is formed to be physically adjacent to the acoustic transducer 506 in order to mitigate the introduction of noise from parasitics that may affect the signal output from the acoustic transducer 506 before that signal is amplified by the pre-amplifier 510. In some examples, the pre-amplifier 510 can be formed within, layered onto, or positioned immediately adjacent the acoustic transducer 506.

The controller 504 may thereafter provide a drive signal 512 to each of the acoustic transducers 502. The drive signal 512 may be specifically timed by a high-resolution timing controller 514 based on the physical location of a particular acoustic transducer 502. More specifically, for embodiments in which the controller 504 is configured to shape the wavefront and/or the direction of the acoustic pulse generated by the acoustic transducer(s) of the acoustic transducers 502 (e.g., beamforming, beam focusing, and so on), the timing at which each of the acoustic transducers 502 receive the drive signal 512 may be of elevated importance.

For example, as may be appreciated, a first acoustic pulse may propagate in a generally spherical manner at a velocity v within the imaging surface from a first acoustic transducer of a particular acoustic transducer 502. In an alternative phrasing, the acoustic pulse may traverse a distance $d_0$ in a particular time period t based on the acoustic velocity of that pulse within the material (or materials) forming the imaging surface.

A second acoustic transducer may be a linear distance $d_1$ from the first acoustic transducer. A second acoustic pulse may be propagated from the second acoustic transducer. The second acoustic pulse may constructively or destructively interfere with the first acoustic pulse at a particular location based, specifically, on the time at which the second acoustic pulse was generated relative to the first acoustic pulse. For example, if the first acoustic pulse and the second acoustic pulse are generated at precisely the same moment, the two pulses may constructively interfere to propagate a generally-planar wavefront in a directly parallel to a vector defined between the first acoustic transducer and the second acoustic transducer. In other words, the generally-planar wavefront may propagate straight outward from the first and second acoustic transducer.

In another example, the second acoustic pulse may be generated after the first acoustic pulse is already propagated in the imaging surface. The time at which the second acoustic pulse is generated affects the point or points at which the first acoustic pulse and the second acoustic pulse interfere with one another (either constructively or destructively). The time at which the second acoustic pulse is generated may also depend upon the velocity v, and the distances $d_0$ and $d_1$.

In this manner, it is appreciated that the timing provided by the timing controller 514 may facilitate any number of suitable wavefront shapes and/or directions. It may be further appreciated that the accuracy with which a particular shape and/or direction of a particular wavefront may be generated may depend upon the accuracy with which the timing controller 514 can control the timing of the various acoustic transducers 502.

As noted above with respect to other embodiments described herein, the transmission tomography acoustic imaging system may be configured to transition from a drive mode (e.g., transmission mode) to a sense mode after an acoustic pulse has been propagated into the imaging surface.

Once in the sense mode, an acoustic transducer 506 of a particular acoustic transducer 502 may be configured to output an electrical signal. The electrical signal output by an acoustic transducer 506 corresponds to the amplitude of a portion of a previously-propagated acoustic pulse. As may be appreciated, the electrical signal output by an acoustic transducer 506 has been attenuated by each point of the contact area. The electrical signal may also contain a noise component.

As noted above, the electrical signal output by an acoustic transducer 506 may be first be amplified by a pre-amplifier 510 that is physically proximate to the acoustic transducer 506. Also as noted above, the physical proximity of this initial amplification stage increases the signal to noise ratio of the signal output from a particular acoustic transducer 502 to the controller 504.

Each acoustic transducer 502, and more specifically the output of the respective pre-amplifier 510, is connected to a multiplexer 516 within the controller 504. The multiplexer 516 may be configured to connect to one or more acoustic transducers 502 at a time. In many cases, the multiplexer 516 is a time multiplexer that couples iteratively couples to different acoustic transducers in order to obtain amplified electrical signals therefrom.

The multiplexer 516 is connected to a carrier rejection module 518. The carrier rejection module 518 is typically implemented as a demodulator configured to demodulate the signal received from the multiplexer 516 to baseband. In many cases, the carrier rejection module 518 includes one or more filters. For example, a band pass filter may be applied to the output of the multiplexer 518, the band pass filter centered (generally) on the carrier frequency. In other examples, a low pass filter may be applied to the output of the carrier rejection module 518 so that high frequency noise may be filtered therefrom. In other cases, other suitable filters may be used. In some cases, a cascade of filters may be used. In other cases, filtering of the signal may be optional.

The carrier rejection module 518 may be (optionally) connected to a gain and/or offset correction module 520. In some examples, the gain and/or offset correction module 520 may be implemented as a low pass filter (e.g., rolling average filter) such as described above. In other cases, the gain and/or offset correction module 520 may be implemented in another manner to normalize the gain and/or the direct current offset present in the signal output from the carrier rejection module 518.

The carrier rejection module 518 or the (optional) gain and/or offset correction module 520 may be coupled to an envelope detection module 522. The envelope detection module 522 may be configured to detect the amplitude of the signal output from the previous stages of the controller 504, within specifically-selected statistical bounds. For example, the envelope detection module 522 may determine that the amplitude of a signal has changed only when that signal exceeds a particular threshold. In other cases, the envelope detection module 522 may determine that the amplitude of a signal has changed only when that signal exceeds a particular average value or is beyond one standard deviation from mean. In other cases, the envelope detection module 522 may employ other suitable techniques.

The envelope detection module 522 may be (optionally) connected to a gain and/or offset correction module 524. In some examples, the gain and/or offset correction module 524 may be implemented as a low pass filter (e.g., rolling average filter) such as described above. In other cases, the gain and/or offset correction module 524 may be implemented in another manner to normalize the gain and/or the direct current offset present in the signal output from the carrier rejection module 518. In many cases, the gain and/or offset correction module 524 includes an analog to digital converter.

Finally, the output of the envelope detection module 522 or the (optional) gain and/or offset correction module 524 may be connected to the image resolver 506. The image resolver 506 may use the values obtained from the gain and/or offset correction module 524 in order to estimate the acoustic attenuation map of the contact area.

FIG. 5B depicts a simplified block diagram of a transmission tomography acoustic imaging system configured for employing diffraction-based tomographic reconstruction techniques. As with other embodiments described herein, the transmission tomography acoustic imaging system 500*b* includes several acoustic transducers 502 that are coupled to a controller 504 which, in turn, is coupled to an image resolver 506.

As with the tomographic imaging system depicted in FIG. 5A, each acoustic transducer 502 can include an acoustic transducer 506 and a pre-amplifier 510. The acoustic transducer 506 can be formed from a piezoelectric material. The pre-amplifier 510, in many examples is formed to be physically adjacent to the acoustic transducer 506 in order to mitigate the introduction of noise from parasitics that may affect the signal output from the acoustic transducer 506 before that signal is amplified by the pre-amplifier 510. In some examples, the pre-amplifier 510 can be formed within, layered onto, or positioned immediately adjacent the acoustic transducer 506.

The controller 504 may thereafter provide a drive signal 512 to each of the acoustic transducers 502. In some examples, the controller 504 may employ beam forming and/or beam focusing techniques such as described with respect to FIG. 5A. However, in other cases, the controller 504 may be configured to drive each individual acoustic transducer 502 individually, thereby effectively propagating an acoustic pulse with a spherical wavefront.

In many cases, the power output (e.g., the maximum amplitude) from a single acoustic transducer may be low. Accordingly, the controller 504 may be configured to apply the drive signal 502 to several acoustic transducers 502 at the same time. Each of these drive signals may be I/Q-encoded (e.g., phase coded) so that the acoustic pulses generated from each of the individual acoustic transducer can be decoded and separated from one another in a subsequent I/Q-demodulation step.

As noted above with respect to other embodiments described herein, the transmission tomography acoustic imaging system may be configured to transition from a drive mode (e.g., transmission mode) to a sense mode after an acoustic pulse has been propagated into the imaging surface.

As with the tomographic imaging system depicted in FIG. 5A, once in the sense mode, an acoustic transducer 506 of a particular acoustic transducer 502 may be configured to output an electrical signal. The electrical signal output by an acoustic transducer 506 corresponds to the amplitude of a portion of a previously-propagated acoustic pulse. As may be appreciated, the electrical signal output by an acoustic transducer 506 has been attenuated by each point of the contact area. The electrical signal may also contain a noise component. Additionally, the output of a particular acoustic transducer may also include multiple components associated with each of the diffraction pattern envelopes that overlap that point.

As noted above, the electrical signal output by an acoustic transducer 506 may be first be amplified by a pre-amplifier 510 that is physically proximate to the acoustic transducer 506. Also as noted above, the physical proximity of this initial amplification stage increases the signal to noise ratio of the signal output from a particular acoustic transducer 502 to the controller 504.

Each acoustic transducer 502, and more specifically the output of the respective pre-amplifier 510, is connected to a multiplexer 516 within the controller 504. The multiplexer 516 may be configured to connect to one or more acoustic transducers 502 at a time. In many cases, the multiplexer 516 is a time multiplexer that couples iteratively couples to different acoustic transducers in order to obtain amplified electrical signals therefrom.

The multiplexer 516 is connected to a carrier rejection module 518. The carrier rejection module 518 is typically implemented as a demodulator configured to demodulate the signal received from the multiplexer 516 to baseband. In many cases, the carrier rejection module 518 includes one or more filters. For example, a band pass filter may be applied to the output of the multiplexer 518, the band pass filter centered (generally) on the carrier frequency. In other examples, a low pass filter may be applied to the output of the carrier rejection module 518 so that high frequency noise may be filtered therefrom. In other cases, other suitable filters may be used. In some cases, a cascade of filters may be used. In other cases, filtering of the signal may be optional.

The carrier rejection module 518 may be (optionally) connected to a gain and/or offset correction module 520. In some examples, the gain and/or offset correction module 520 may be implemented as a low pass filter (e.g., rolling average filter) such as described above. In other cases, the gain and/or offset correction module 520 may be implemented in another manner to normalize the gain and/or the direct current offset present in the signal output from the carrier rejection module 518.

The carrier rejection module 518 (or the output of the gain and/or offset correction module 520) may be connected to an I/Q demodulation module 526. The I/Q demodulation module 526 may be configured to separate the in-phase components from the quadrature-encoded components, which, in turn may be correlated to individual acoustic transducers (and the locations thereof). In this manner, the I/Q demodulation module 526 may effectively separate different diffraction patterns from one another.

The I/Q demodulation module 526 may be (optionally) connected to a gain and/or offset correction module 526. In some examples, the gain and/or offset correction module 526 may be implemented as a low pass filter (e.g., rolling average filter) such as described above. In other cases, the gain and/or offset correction module 526 may be implemented in another manner to normalize the gain and/or the direct current offset present in the signal output from the carrier rejection module 518. In many cases, the gain and/or offset correction module 526 includes an analog to digital converter.

Finally, the output of the I/Q demodulation module 526 or the (optional) gain and/or offset correction module 526 may be connected to the image resolver 506. The image resolver 506 may use the values obtained from the gain and/or offset correction module 524 in order to estimate the acoustic attenuation map of the contact area.

Example Operation of a Reflection-Based Image Resolver

Generally and broadly, FIGS. 6-8F reference an acoustic imaging system 800 incorporating a reflection-based image resolver (not shown). As with other embodiment described herein, the acoustic imaging system 600 includes a number of acoustic transducers, a controller, an image resolver, and a touch sensor.

As with other embodiments described herein, when a user touches the imaging surface, the touch sensor determines the contact area. Once the contact area is determined, the controller initiates one or more transmitting operations, often specifically targeted to the contact area, with one or more of the acoustic transducers. The transmitting operations may be single-pulse transmitting operations and/or multi-pulse transmitting operations that are coded using any suitable coding pattern or technique.

Once the acoustic imaging system 600 obtains a sufficient quantity of reflection information, the image resolver may estimate or approximate an acoustic properties map of the contact area—corresponding to local acoustic reflection coefficients—using any suitable method.

Figure 6:
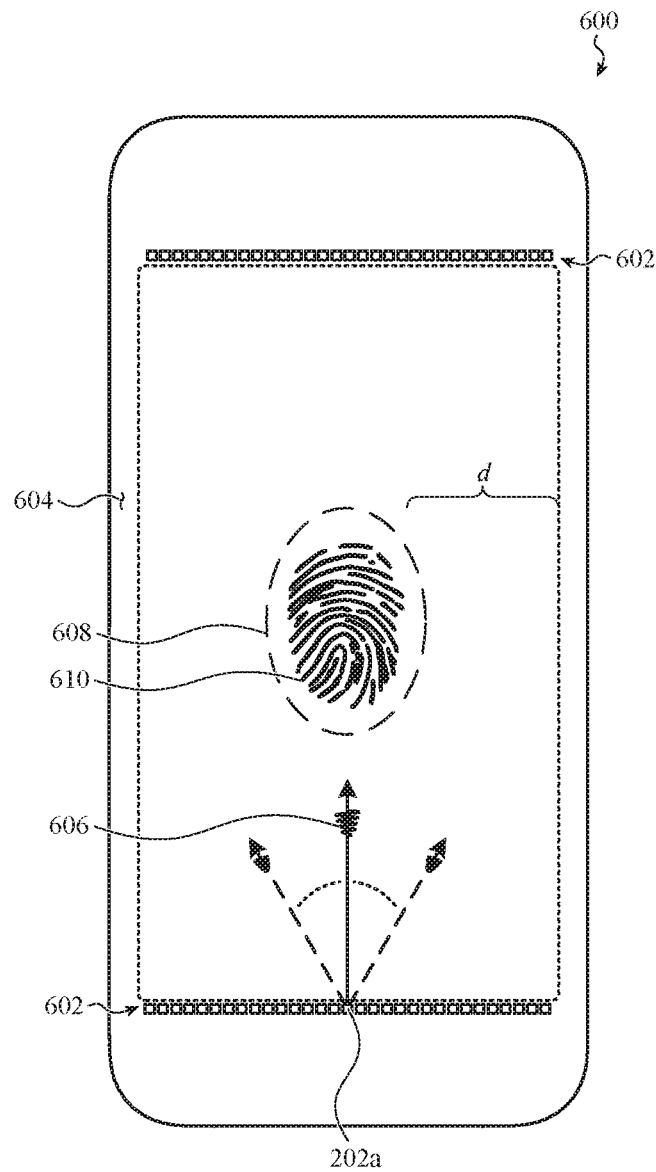
FIG. 6 depicts an acoustic imaging system, particularly showing one example distribution of acoustic transducers positioned relative to a top and bottom edge of a rectangular subarea of the imaging surface.

The acoustic transducers of the acoustic imaging system 600 can be distributed on the imaging surface in any suitable pattern or manner (see, e.g., FIGS. 3A-3G). Typically, the acoustic transducers are disposed relative to a periphery of the imaging surface, but this may not be required of all embodiments. For example, as shown in FIG. 6, the acoustic transducers 602 can be disposed relative to a top edge and a bottom edge of a rectangular section of an imaging surface 604. In this example, the imaging surface 604 may be an outer protective layer positioned over a display, such as the display 104 depicted in FIG. 1.

In other examples, the acoustic transducers are disposed relative to the imaging surface in another manner. For example, the acoustic transducers can be disposed to circumscribe an entire perimeter of a subarea of the imaging surface. In this example, the acoustic transducers define a substantially enclosed rectangular subarea that may be associated with an outer protective layer of a display, such as the display 104 depicted in FIG. 1.

When in the transmission mode, the controller causes the acoustic pulse 606 to propagate through the imaging surface in the direction of the contact area 608. The acoustic pulse 606 can have any suitable wavefront shape.

Once the acoustic pulse 606 reaches the contact area 608, portions of the acoustic pulse 606 are progressively attenuated and/or reflected by the various features of the object (not shown) in contact with the imaging surface, such as the ridges of a user's fingerprint. In other words, portions of the acoustic pulse 606 are progressively attenuated and/or reflected by an amount defined by unknown function that is based on the local reflection coefficient(s) of each point through which that particular portion of the acoustic pulse 606 passes.

In other words, the acoustic pulse 606 may be progressively reflected, at different locations and times, as the acoustic pulse 606 propagates through the contact area 608. Each of these reflections (collectively, the reflection information) may be received at the acoustic transducers at different times and at different attenuations.

Once the reflection information corresponding to the acoustic pulse 606 is received, the controller of the acoustic imaging system 600 can perform another transmitting operation. The transmitting operation can be associated with the acoustic transducers, or another acoustic transducer of the acoustic transducers.

In some embodiments, the acoustic imaging system 600 may exclusively perform single-pulse transmitting operations. In these examples, the controller may sequentially (or otherwise) cycle through acoustic transducers individually, collecting and accumulating reflection information associated with each.

In other embodiments, the acoustic imaging system 600 may exclusively perform multi-pulse transmitting operations. The controller may sequentially (or otherwise) cycle through acoustic transducers individually, collecting and accumulating reflection information associated with each.

In many embodiments, however, the acoustic imaging system 600 may shift between single-pulse transmitting operations and multi-pulse transmitting operations. For example, a single-pulse transmitting operation may be performed when the contact area 608 is nearby an edge of the imaging surface (below a threshold distance d from an edge of the imaging surface or a subarea of the imaging surface) or when the contact area 608 is nearby the acoustic transducers. In other cases, a multi-pulse transmitting operation may be performed when the contact area is within a central portion of the imaging surface. It may be appreciated that the listing given above is not exhaustive; other embodiments may perform a variety of transmitting operations in any other suitable implementation-specific or appropriate manner or pattern.

As noted above, once the acoustic imaging system 600 obtains a sufficient amount of reflection information, an acoustic properties map 610 can be generated by the image resolver using a suitable technique such as, but not limited to, reflection tomography techniques.

It is appreciated that the acoustic imaging system 600 depicted in FIG. 6 can be implemented in a number of suitable and implementation-specific ways. However, broadly and generally, the acoustic imaging system 600 determines and/or estimates an acoustic properties map of the contact area and/or changes therein over time, to obtain an image of a user's fingerprint. The acoustic imaging system 600 performs single- and/or multi-pulse transmitting operation that may be generally targeted toward a contact area determined by a touch sensor. Thereafter, reflection information can be obtained from one or more acoustic transducers.

Any of these operations, or portions of these operations, may be performed by the controller, by the touch sensor, by the image resolver, and/or performed, at least in part, as a result of cooperation and communication therebetween. In other words, the example components of the acoustic imaging system 600 may be independently or cooperatively configured, adapted, or otherwise implemented to perform, coordinate, or monitor any number of suitable operations of the acoustic imaging system 600 described above.

For example, the controller (in the transmission mode) can induce the acoustic pulse 606 in any suitable manner. For example, the controller can drive the acoustic transducers with a single pulse, an impulse, a chirp signal, or several periods of a sinusoidal signal in order to produce the acoustic pulse 606, an acoustic chirp, or a monochromatic acoustic signal within the imaging surface, respectively.

Additionally, the controller can shape the acoustic pulse 606 in any suitable manner, using one or more acoustic transducers. For example, the controller can be configured to generate the acoustic pulse 606 such that the acoustic pulse 606 exhibits a planar wavefront that takes a particular shape. For example, a longitudinal acoustic pulse may exhibit a wavefront, whereas an omnidirectional acoustic pulse may exhibit a circular or curved wavefront. Other acoustic pulses can exhibit other wavefront shapes. The controller can employ beam-forming techniques in order to shape the wavefront of a particular acoustic pulse 606 into any suitable or implementation-specific shape.

Additionally, the controller can cause the acoustic pulse 606 to propagate in any suitable direction. The controller can employ beam-forming techniques in order to direct the wavefront of a particular acoustic pulse 606 to propagate along a particular direction.

Thus, generally and broadly, the controller can induce any suitable acoustic pulse, exhibiting any suitable wavefront shape, that propagates along any suitable direction. In one example, the controller is configured to induce a monochromatic acoustic pulse by causing a resonant mode of one or more acoustic transistors.

Once the controller (in the transmission mode) has induced a suitable acoustic pulse into the imaging surface that is directed toward the contact area 608, the controller can transition into the receiving mode to obtain reflection information. In a receiving mode, the controller couples to one or more acoustic transducers, sampling electrical signals generated thereby over a period of time. In many cases, the controller transitions to the receiving mode immediately after generating the acoustic pulse 606 in the transmission mode.

The touch sensor may be configured to determine a single contact area (e.g., single touch by a user) or may be configured to determine multiple independent or overlapping contact areas (e.g., multiple simultaneous touches by a user, or multiple simultaneous touches by multiple users). For simplicity of description of the embodiments that follow, a single contact area, the contact area 608, is referenced. However, it may be appreciated that for any embodiment described herein, and variants and modifications of the same, multiple contact areas may be detected by the touch sensor, and, correspondingly, imaged by the acoustic imaging system 600.

In many embodiments, the image resolver, the touch sensor, and the controller are implemented as separate components of the acoustic imaging system 600, although such a configuration is not required. For example, in one embodiment the image resolver and the controller can be subcomponents of a single component, such as instructions or subroutines executed by a single processor.

As noted above, the foregoing description of the various acoustic imaging system 600 embodiments depicted and described with respect to FIG. 6, and the various alternatives thereof and variations thereto are presented, generally, for purposes of explanation, and to facilitate a thorough understanding of the detailed embodiments presented herein. Accordingly, it may be understood that any suitable system may be configured to perform the operations recited with respect thereto.

Figure 7:
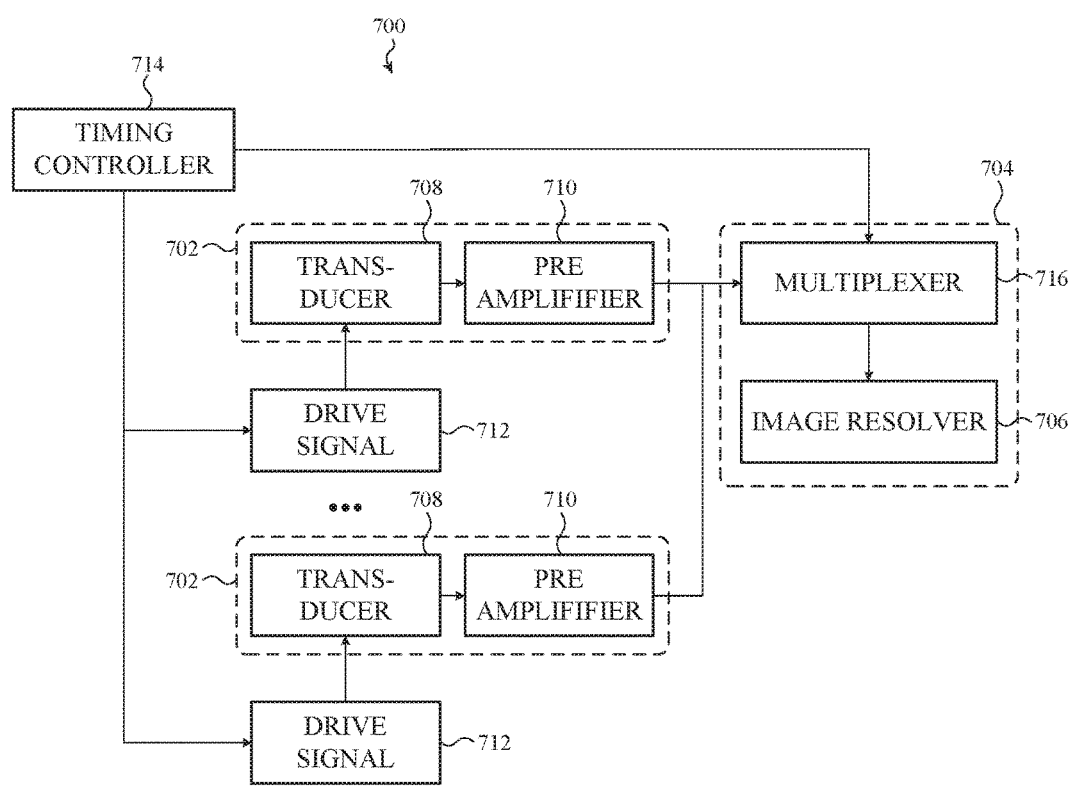
FIG. 7 depicts a simplified block diagram of an acoustic imaging system incorporating a reflection-based image resolver configured to generate a two-dimensional image of a fingerprint in contact with an imaging surface such as described herein.

FIG. 7 depicts a simplified block diagram of an acoustic imaging system such as described herein. The acoustic imaging system 700 includes several acoustic transducers 702 that are coupled to a controller 704 which, in turn, is coupled to an image resolver 706.

Each acoustic transducer of the several acoustic transducers 702 can include an acoustic transducer 708 and a pre-amplifier 710. The acoustic transducer 708 can be formed from a piezoelectric material. The pre-amplifier 710, in many examples is formed to be physically adjacent to the acoustic transducer 708 in order to mitigate the introduction of noise from parasitics that may affect the signal output from the acoustic transducer 708 before that signal is amplified by the pre-amplifier 710. In some examples, the pre-amplifier 710 can be formed within, layered onto, or positioned immediately adjacent the acoustic transducer 708.

The controller 704 may thereafter provide a drive signal 712 to each of the acoustic transducers 702. The drive signal 712 may be specifically timed by a high-resolution timing controller 714 based on the physical location of a particular acoustic transducer. In many case, the drive signal 712 may be an impulse voltage signal. In further embodiments, the drive signal may be a coded voltage signal, including multiple independent impulses. Example impulses are shown and described with reference to FIGS. 8A-8F.

As noted above with respect to other embodiments described herein, the acoustic imaging system 700 may be configured to transition from a transmission mode to a sense mode after an acoustic pulse, or a series of acoustic pulses, has been propagated into the imaging surface.

Once in the sense mode, an acoustic transducer 708 of a particular acoustic transducer may be configured to output an electrical signal. The electrical signal output by an acoustic transducer 708 corresponds to the amplitude of a portion of a previously-propagated acoustic pulse (e.g., reflection information). As may be appreciated, the electrical signal output by an acoustic transducer 708 has been attenuated and reflected by each point of the contact area. The electrical signal may also contain one or more noise components, multi-path artifacts, and so on.

The electrical signal output by an acoustic transducer 708 may be first be amplified by a pre-amplifier 710 that is physically proximate to the acoustic transducer 708. Also as noted above, the physical proximity of this initial amplification stage increases the signal to noise ratio of the signal output from a particular acoustic transducer to the controller 704.

Each acoustic transducer, and more specifically the output of the respective pre-amplifier 710, is connected to a multiplexer 716 within the controller 704. The multiplexer 716 may be configured to connect to one or more acoustic transducers 702 at a time. In many cases, the multiplexer 716 is a time multiplexer that couples iteratively couples to different acoustic transducers in order to obtain amplified electrical signals therefrom.

The output of the multiplexer 716 may be connected to the image resolver 706. The image resolver 706 may use the values obtained from the multiplexer 716 in order to estimate the acoustic properties map of the contact area.

In further embodiments, additional or fewer components or stages may be included. These can include, but are not limited to: gain correction stages, spatial filtering stages, high-pass filtering stages, low-pass filtering stages; band-stop filtering stages; band-pass filtering stages; and so on.

Generally and broadly, FIGS. 8A-8F depict different coded drive signals that may be used by a controller, such as the controller depicted in FIG. 2. It may be appreciated that these are merely examples of different drive signals and that other embodiments may be implemented differently.

Figure 8A:
FIG. 8A is a graphical representation of one example voltage waveform that may be applied to an acoustic transducer such as described herein.

In particular, FIG. 8A depicts one example of an impulse voltage signal 800 that causes a resonant mode of an acoustic transducer. As noted above, the resonant mode may cause the acoustic transducer to resonate for a brief period of time, thereby causing an acoustic output 802 at the resonant frequency. The acoustic output 802 is depicted as a decaying sinusoidal wave having five periods, but it may be appreciated that this is merely one example and other possible resonant waveforms are possible. For example, in some embodiments, the acoustic transducer may resonate for a longer or shorter period of time.

The impulse voltage signal 800 can have any suitable impulse shape; the figure shows the impulse voltage signal 800 as having a square wave shape, although this is merely one example. Other example, impulse voltage shapes include a half-sine impulse, a triangular impulse, a ramp impulse, and so on.

The impulse voltage signal 800 may be associated with a single-pulse transmitting operation.

Figure 8B:
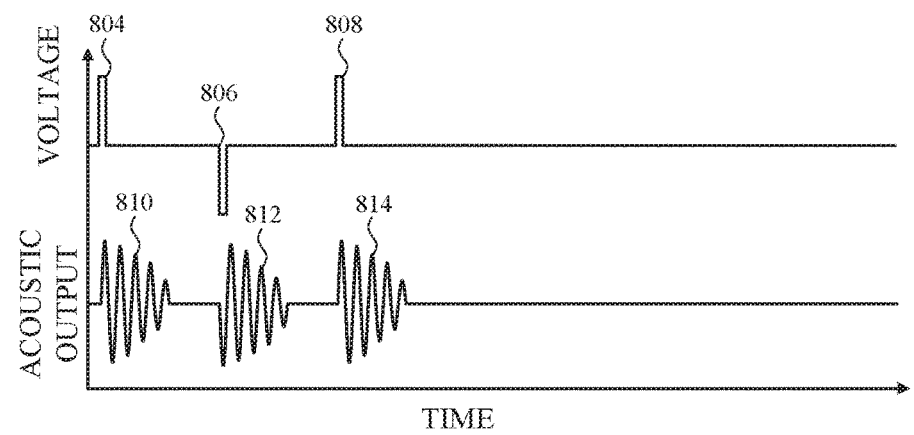
FIG. 8B is a graphical representation of one example coded voltage waveform that may be applied to an acoustic transducer such as described herein.

FIG. 8B depicts one example of a coded impulse voltage signal that causes multiple resonant modes of an acoustic transducer. In particular, three impulse voltages having different polarities are shown and labeled, respectively, as the impulse voltage signal 804, the impulse voltage signal 806, and the impulse voltage signal 808. These impulse voltage signals may cause three corresponding acoustic outputs 810, 812, and 814. The phase of the acoustic outputs may depend upon the polarity of the associated impulse voltage signal.

As with the embodiment depicted in FIG. 8A, the impulse voltage signals 804, 806, 808 can have any suitable impulse shape; the figure shows the impulse voltage signals as having a square wave shape. Other example, impulse voltage shapes include a half-sine impulse, a triangular impulse, a ramp impulse, and so on.

The impulse voltage signals 804, 806, and 808 may be associated with a multi-pulse transmitting operation. Although impulse voltage signals are shown, it may be appreciated that other numbers of impulses can be provided. The impulse voltage signals 804, 806, and 808 are depicted as separated by a repeating gap, although this may not be required.

Figure 8C:
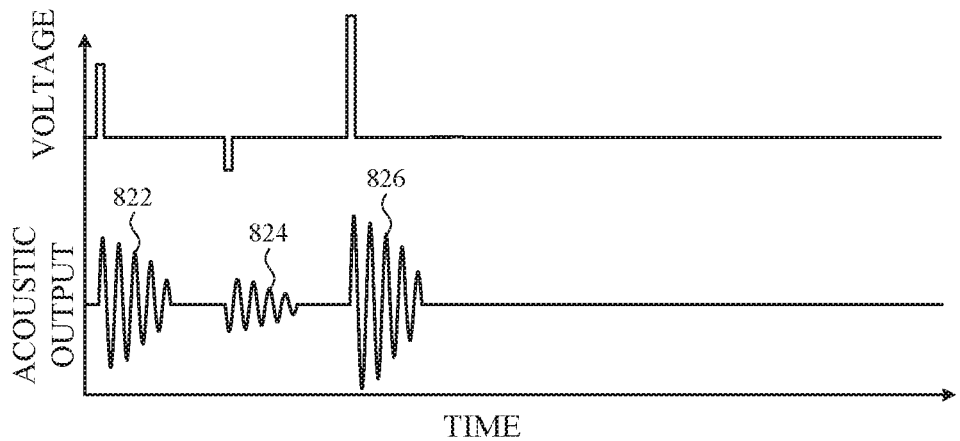
FIG. 8C is a graphical representation of another example coded voltage waveform that may be applied to an acoustic transducer such as described herein.
Figure 8D:
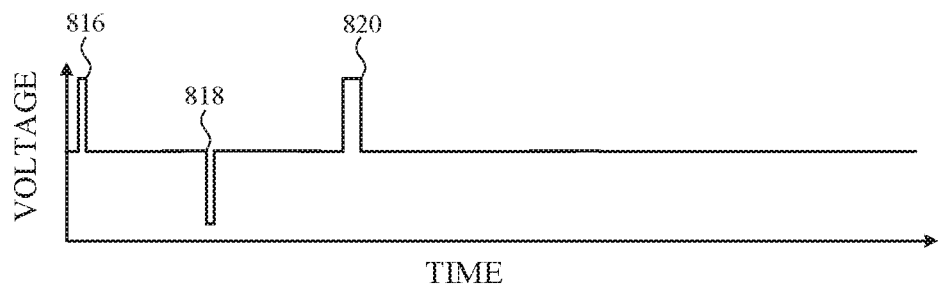
FIG. 8D is a graphical representation of yet another example coded voltage waveform that may be applied to an acoustic transducer such as described herein.

In other examples, a coded multi-pulse transmitting operation can be provided with impulse voltage signals that impart different amounts of acoustic energy into an acoustic transducer. For example, as shown in FIG. 8C, three impulse voltage signals 816, 818, and 820 are provided with different magnitudes and polarities. Correspondingly, the associated acoustic outputs 822, 824, and 826 may have different have different magnitudes and different polarities. In other example, as shown in FIG. 8D, three impulse voltage signals 816, 818, and 820 are provided with different polarities and durations.

Figure 8E:
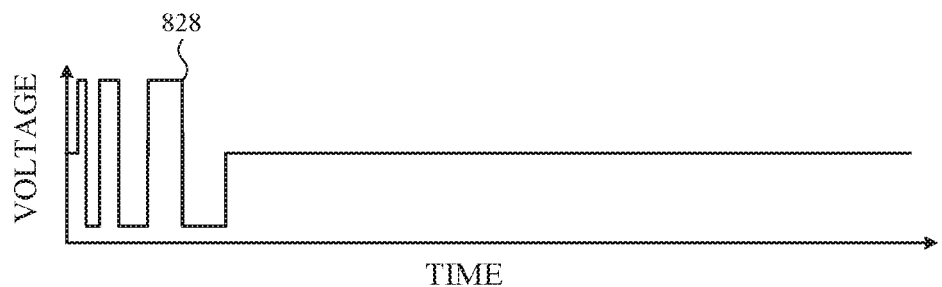
FIG. 8E is a graphical representation of yet another example coded voltage waveform that may be applied to an acoustic transducer such as described herein.

In other examples, an transmitting operation can be provided with a voltage signal that takes a chirp waveform 828, such as shown in FIG. 8E. The chirp waveform can be any suitable chirp waveform.

Figure 8F:
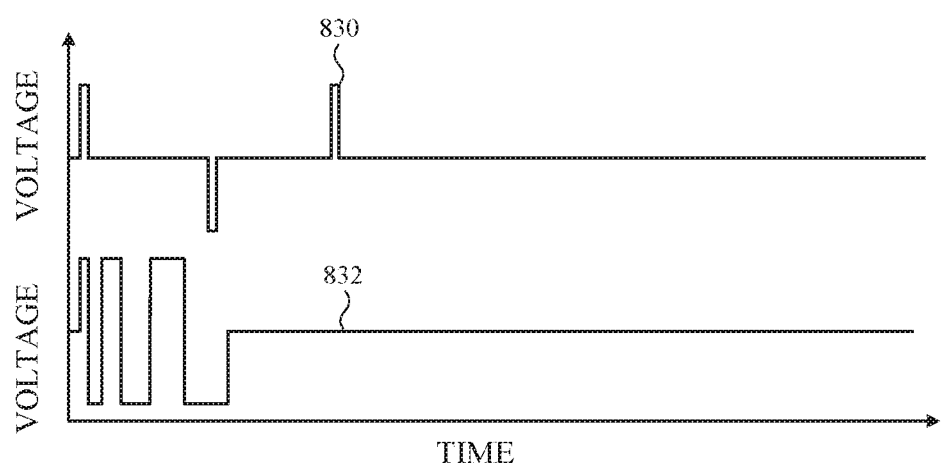
FIG. 8F is a graphical representation of two coded voltage waveforms that may be applied to two acoustic transducers such as described herein.

In yet other examples, two transmitting operations can be performed at the same time by providing two differently-coded signals 830, 832 to two different acoustic transducers. For example, as shown in FIG. 8F, a first and a second encoding may be used.

It is appreciated that the voltage signals depicted in FIGS. 8A-8F can be implemented in a number of suitable and implementation-specific ways. However, broadly and generally, it may be understood that an electrical signal is applied to an acoustic transducer in a manner that causes the acoustic transducer to generate an acoustic output that typically takes the form of an acoustic pulse. In some examples, a single acoustic pulse may be generated. In other examples, multiple acoustic pulses may be generated in rapid succession. In many cases, multiple acoustic pulses are coded. In some cases, the codes may be shift-insensitive, but this may not be required of all embodiments. In some examples, an transmitting operation can be spatially coded. These acoustic pulses may be propagated orthogonal to one another such that reflections corresponding to one of the acoustic pulses do not destructively interfere with reflections corresponding to the other acoustic pulse.

In some cases, an transmitting operation completes before a subsequent transmitting operation begins. In other examples, a subsequent transmitting operation that is coded differently from the current transmitting operation may be initiated once the acoustic pulse(s) of the current transmitting operation reach the contact area.

The foregoing description of the embodiments depicted in FIGS. 4A-8F, and various alternatives and variations, are presented, generally, for purposes of explanation, and to facilitate a thorough understanding of various techniques that may be employed to operate an image resolver of an acoustic imaging system such as described herein. However, it will be apparent to one skilled in the art that some of the specific details presented herein may not be required in order to practice a particular described embodiment, or an equivalent thereof.

Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some cases, the function and/or operation of an image resolver (regardless of configuration) can be assisted by a specific distribution of acoustic transducers. More specifically, an acoustic imaging system can include a controller configured to propagate a mechanical wave or pulse that has a fundamental frequency. The image resolver of this acoustic imaging system may be configured to demodulate any received signals (e.g., reflections, attenuations, diffractions, and so on) before processing said signals. In another phrasing, the image resolver may include one or more demodulation or carrier rejection operations.

Figure 9A:
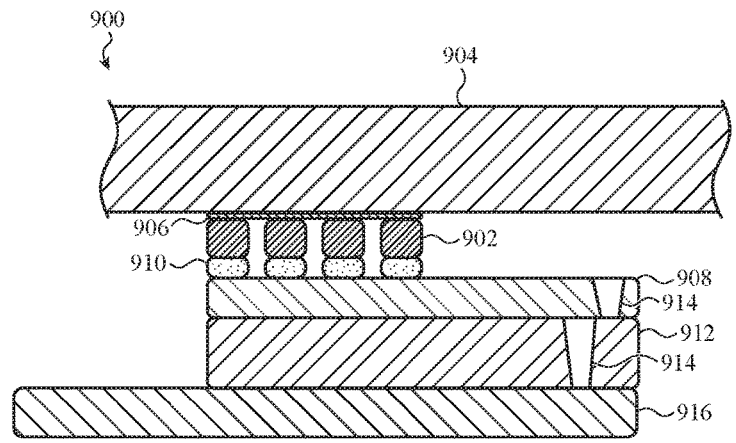
FIG. 9A depicts a simplified cross-section of a portion of an acoustic imaging system such as described herein.

In such examples, acoustic transducers can be arranged in rows that are separated from one another at an interval related to the fundamental frequency at which those transistors are driven during a drive operation (e.g., one period, one half period, ninety degrees out of phase, and so on). For example, FIG. 9A depicts a simplified cross-section of a portion of an acoustic imaging system 900 in a first configuration. The acoustic transducers 902 are coupled to an imaging surface 904 and may be grounded using a ground layer 906. The acoustic transducers 902 may also be bonded or otherwise coupled to a first circuit layer 908 using an epoxy 910, a pressure sensitive adhesive or other techniques.

The first circuit layer 908 may include various components for processing, receiving and/or transmitting the electrical signal received from the acoustic transducers 902. For example, in one implementation, the first circuit layer 908 includes one or more electrodes and a shift register. The shift register may include row and column drivers for the acoustic transducers 902 and one or more multiplexers. Although specific components are mentioned, the first circuit layer 908 may have additional (or fewer) components. In some embodiments, the first circuit layer 908, and more specifically the electrodes within the first circuit layer 908, are placed as close to the acoustic transducers 902 as possible so as to avoid signal degradation.

The first circuit layer 908 may be arranged in a stacked configuration with or otherwise coupled to a second circuit layer 912. The second circuit layer 912 may include additional components for processing and/or transmitting the signals received by the acoustic transducers 902. For example, in one embodiment, the second circuit layer 912 may include an analog front end, a processor, a controller and other such components that are used to process or otherwise transmit the information received from the first circuit layer 908. In one implementation, the first circuit layer 908 is coupled to the second circuit layer using one or more vias 914.

The first circuit layer 908 and/or the second circuit layer 912 may also be coupled to a user input surface 916. The user input surface 916 may be a flexible user input surface. The user input surface 916 may include various components, transmission lines and the like for transmitting and/or processing the signals received from the acoustic transducers 902 via the first circuit layer 908 and the second circuit layer 912.

Figure 9B:
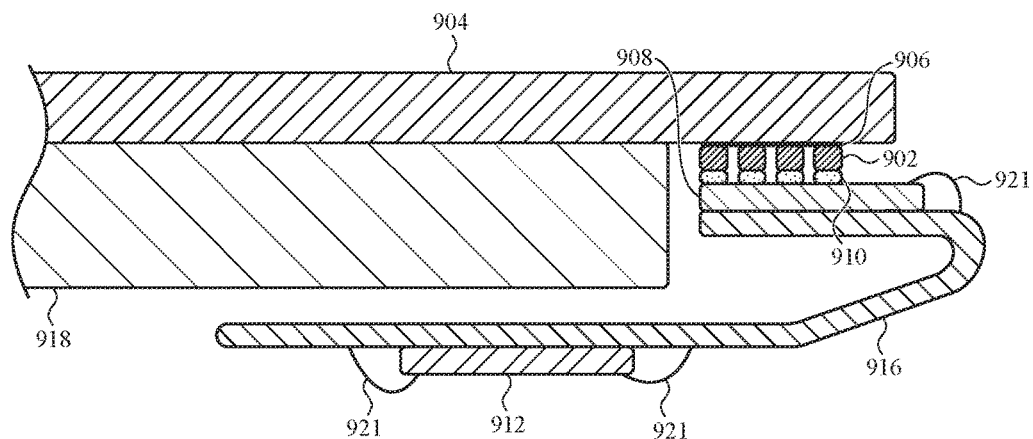
FIG. 9B depicts another simplified cross-section of a portion of an acoustic imaging system such as described herein.

FIG. 9B depicts a simplified cross-section of a portion of an acoustic imaging system 900 in a second configuration. The acoustic imaging system 900 includes one or more acoustic transducers 902. The acoustic transducers 902 may be similar to the acoustic transducers 302 shown and described above with respect to FIGS. 3A-3G.

The acoustic transducers 902 may be coupled to an imaging surface 904 of an electronic device and be adjacent a display 918. The acoustic transducers 902 may also be grounded using a ground layer 906 positioned underneath the imaging surface 904. As with the embodiment described above with respect to FIG. 9A, the acoustic transducers 902 may be bonded or otherwise coupled to a first circuit layer 908 using an epoxy 910, a pressure sensitive adhesive or other techniques. The first circuit layer 908 may include one or more electrodes, a shift register, one or more multiplexers, drive circuitry and the like. In some implementations, the first circuit layer 908 may be a thin-film transistor layer.

The first circuit layer 908 may be coupled to a first portion of a user input surface 916. The user input surface 916 may be a flexible user input surface. The user input surface may be manipulated, bent or folded such as shown. The acoustic imaging system 900 may also include a second circuit layer 912 such as described above. However, in this implementation, the second circuit layer 912 is separated from the first circuit layer 908 and positioned on a second portion of the user input surface 916. In some implementations each of the first circuit layer 908 and the second circuit layer 912 may be bonded to their respective portions of the user input surface 916 using a wirebond 921.

Figure 9C:
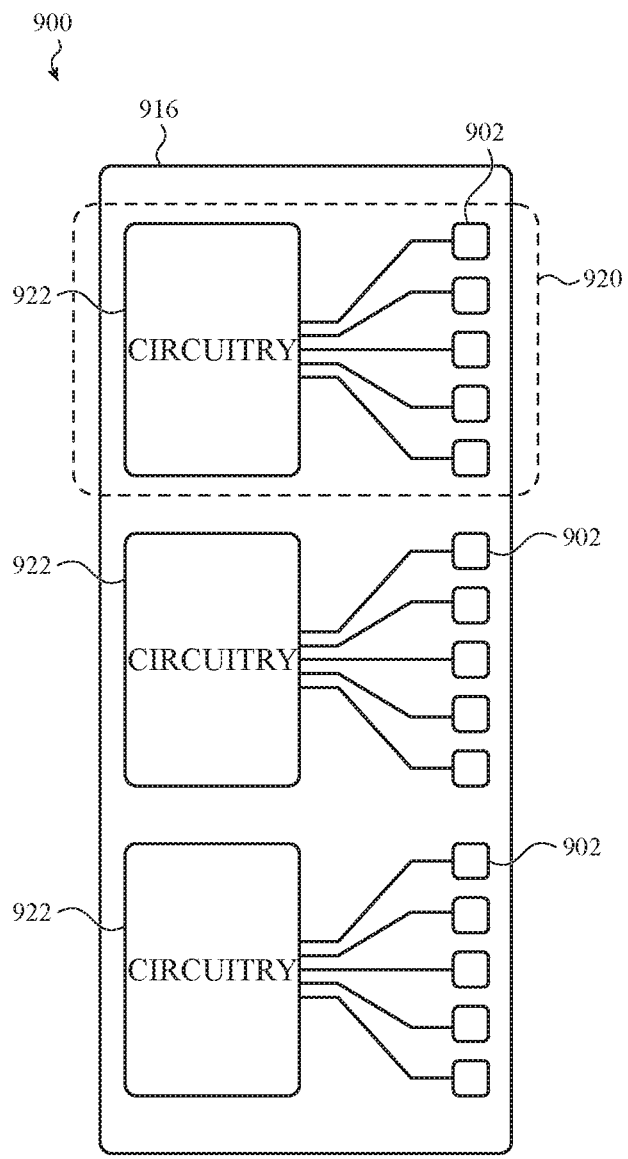
FIG. 9C depicts an acoustic imaging system implemented with a distributed controller.

FIG. 9C illustrates a third example arrangement of acoustic transducers 902 in an acoustic imaging system 900 implemented with a distributed controller topology. As shown in FIG. 9C, the acoustic transducers 902 are arranged or otherwise grouped in a subgroup 920.

In this implementation, the acoustic transducers 902 may be coupled to a user input surface 916. The user input surface 916 may be a flexible user input surface such as describe above. The user input surface 916 includes one or more routings that connect the acoustic transducers 902 to a circuitry layer 922.

For example, each of the acoustic transducers 902 in a subgroup 920 may be coupled to a single circuitry layer 922. In this particular implementation, the circuitry layer 922 includes some or all of the components in the first circuit layer 908 and the second circuit layer 912 described above. For example, the circuitry layer 922 may include one or more electrodes, a multiplexer, an analog front end and so on. In other implementations, a single acoustic transducer 920 may be connected to a single circuitry layer 922.

Figure 9D:
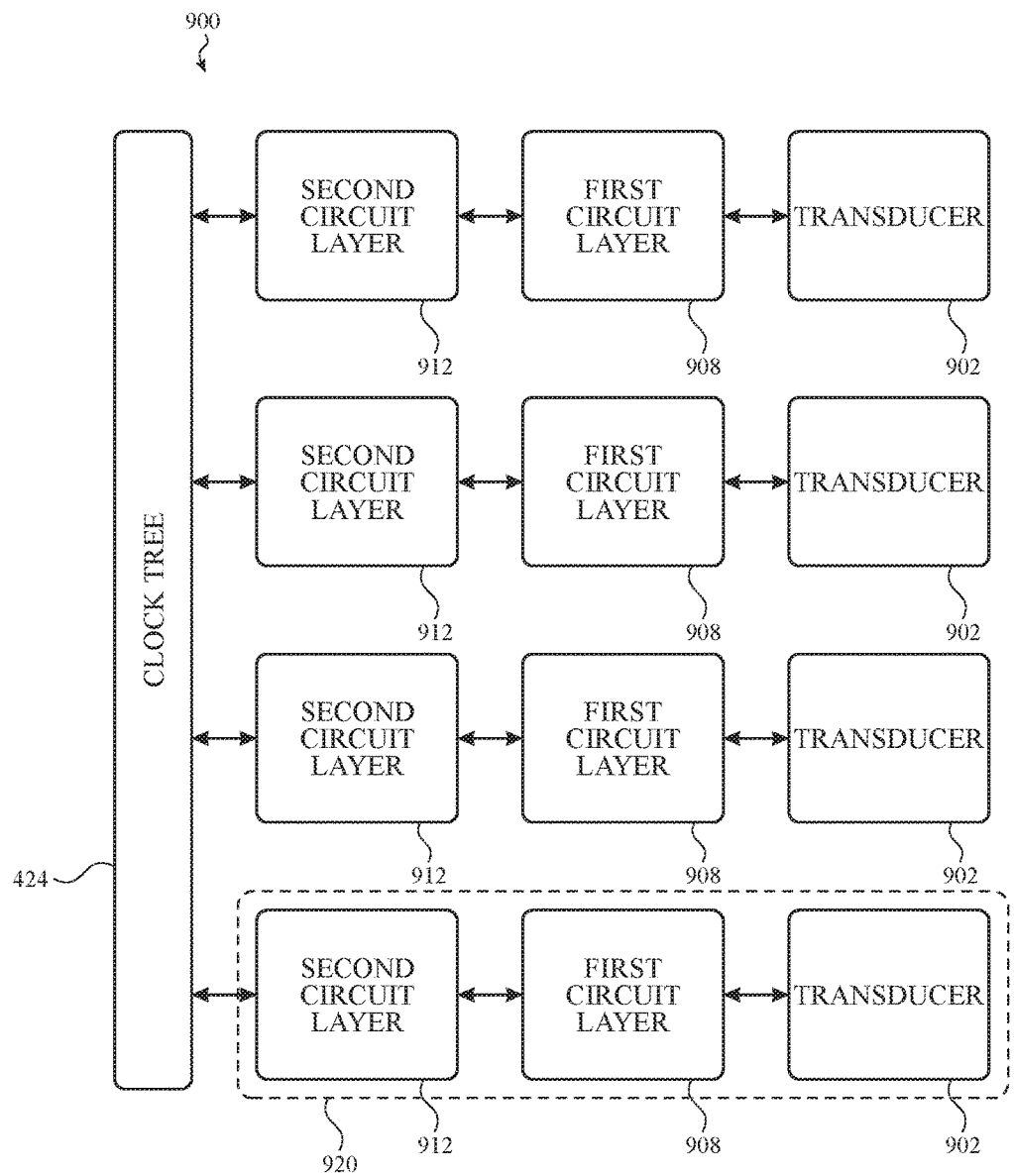
FIG. 9D depicts another acoustic imaging system implemented with a distributed controller.

FIG. 9D illustrates a fourth arrangement of acoustic transducers 902 in an acoustic imaging system 900 implemented with a distributed controller topology. In this implementation, the acoustic transducers 902 may be made up of an array of acoustic transducers 902. Each acoustic transducer 902 or the array of acoustic transducers, may be connected to a first circuit layer 908. The first circuit layer 908 may include the various circuitry and components described above.

The first circuit layer 908 may also be coupled or otherwise connected to a second circuit layer 912. The second circuit layer 912 may include the various circuitry and components described above. For example, the second circuit layer 912 may include an analog front end. In some implementations, the second circuit layer 912 may include an analog front end for each acoustic transducer 902 in the array. In another implementation, a single analog front end may be shared by multiple acoustic transducers 902.

The array of acoustic transducers 902, the first circuit layer 908 and the second circuit layer 912 may make up a subgroup 920 such as described above. Each subgroup may be operated independently. For example, a clock tree 924, or other timing component, may be used to determine when to fire the each of the acoustic transducers 902 in each subgroup 920 and/or the order and timing of firing each subgroup 920. For example, a first acoustic transducer array in a first subgroup may transmit and/or receive a first signal at a first time period and a second acoustic transducer array in a second subgroup may transmit and/or receive a second signal at a second time period.

The foregoing description of the embodiments depicted in FIGS. 9A-9D, and various alternatives and variations, are presented, generally, for purposes of explanation, and to facilitate a thorough understanding of various techniques that may be employed to couple a group of acoustic transducers to a drive circuit and/or a read circuit and, separately or additionally, various techniques that may be employed to couple an acoustic transducer to an imaging surface. However, it will be apparent to one skilled in the art that some of the specific details presented herein may not be required in order to practice a particular described embodiment, or an equivalent thereof.

Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Generally and broadly, FIGS. 10A-10D depict various cross-sections of an acoustic imaging system such as described herein. In particular, these embodiments show various means of coupling an acoustic transducer to an imaging surface. More specifically, in these embodiments, one or more portions of a display (e.g., thin-film transistor layer, polarizer layer, and so on) may be used to support one or more acoustic transducers.

Figure 10A:
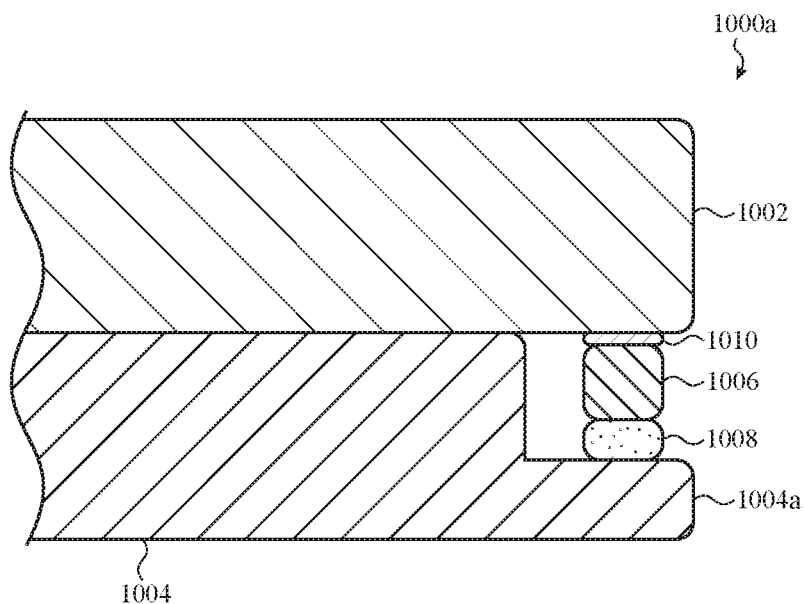
FIG. 10A depicts another acoustic imaging system such as described herein, specifically showing an extended thin-film transistor layer, associated with a display of an electronic device, supporting an acoustic transducer.

FIG. 10A depicts another acoustic imaging system 1000a such as described herein, specifically showing an extended thin-film transistor layer, associated with a display of an electronic device, supporting an acoustic transducer. In this example, an outer cover positioned over the display is the imaging surface 1002. A thin-film transistor layer 1004 (or another layer within a display stack), associated with the display, includes a shelf portion 1004a that is configured to support an acoustic transducer 1006. More specifically, the acoustic transducer 1006 is positioned over a spacer 1008 that directly contacts the shelf portion 1004 of the thin-film transistor layer 1004. In some cases, the spacer 1008 also connects the acoustic transducer 1006 to a circuit formed on or otherwise associated with the thin-film transistor layer 1004. In some cases, the circuit may include an amplifier configured to pre-amplify signals received from the acoustic transducer 1006 but this is not required. The acoustic transducer 1006 couples to an electrode 1010 disposed and/or formed on an underside of the imaging surface 1002. In this example, the acoustic transducer 1006 is oriented generally perpendicular to the underside the imaging surface 1002, although this is not required.

Figure 10B:
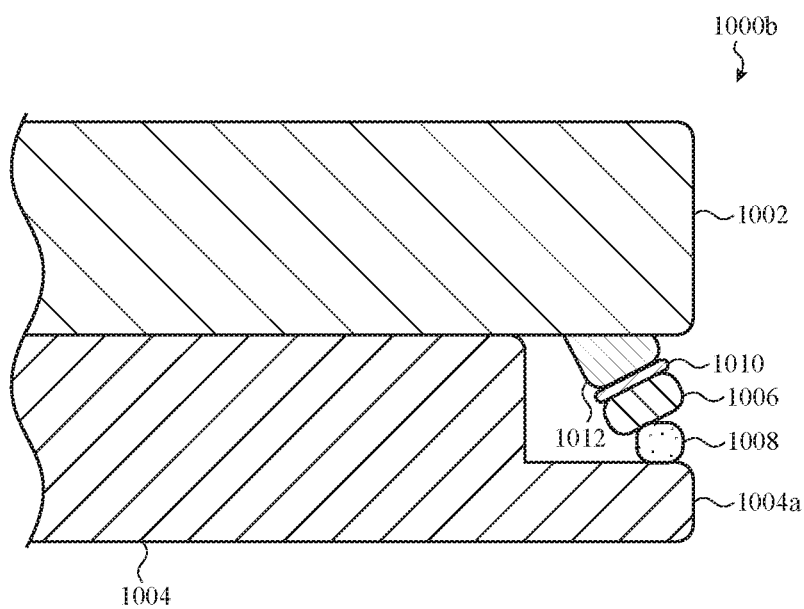
FIG. 10B depicts another acoustic imaging system such as described herein, specifically showing an extended thin-film transistor layer, associated with a display of an electronic device, supporting an acoustic transducer.

For example, FIG. 10B depicts another acoustic imaging system 1000b such as described herein, specifically showing an extended thin-film transistor layer (associated with a display of an electronic device) supporting an acoustic transducer. In this example, the shelf portion 1004a accommodates the acoustic transducer 1006 at an angle relative to the underside of the imaging surface 1002, supported by an angled electrode extension 1012.

Figure 10C:
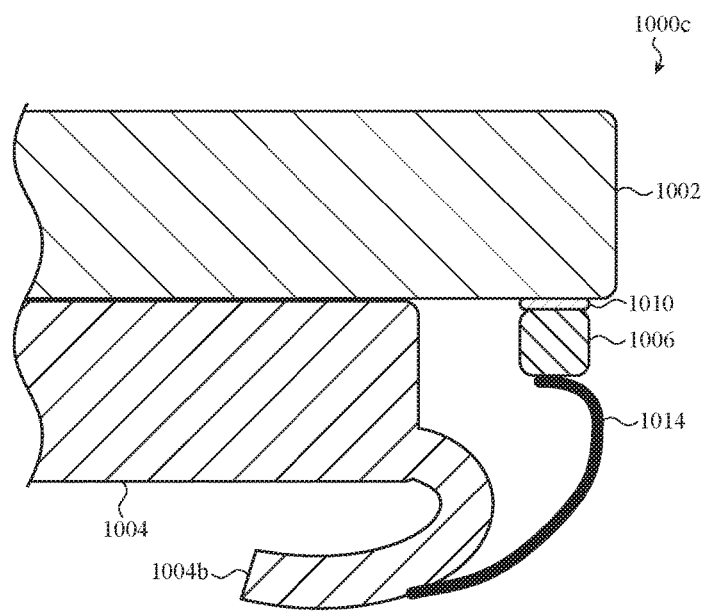
FIG. 10C depicts another acoustic imaging system such as described herein, specifically showing an extended thin-film transistor layer, associated with a display of an electronic device, supporting an acoustic transducer.
Figure 10D:
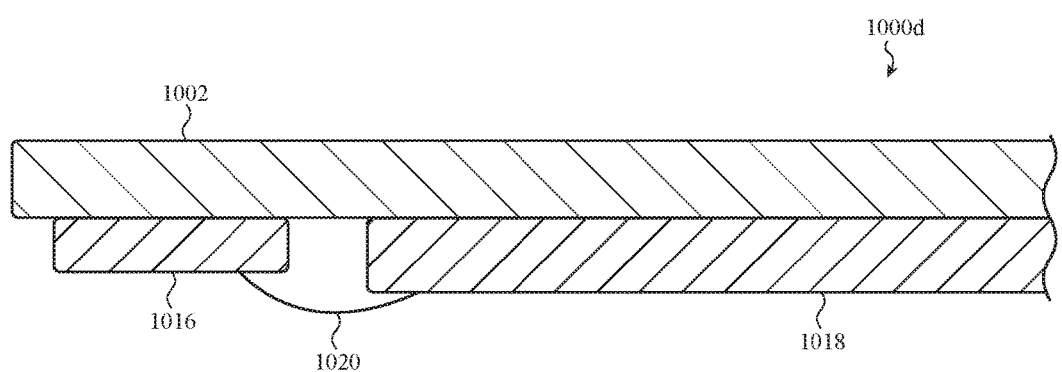
FIG. 10D depicts another acoustic imaging system such as described herein, specifically showing an extended thin-film transistor layer, associated with a display of an electronic device, supporting an acoustic transducer.

In yet another example, the thin-film transistor layer can accommodate an electrical connection and/or circuit that can be used to drive or reads the acoustic transducer 1006 in another manner. For example, as shown in FIG. 10C, a flex 1004b that extends from the thin-film transistor layer can connect to the acoustic transducer 1006 via a second flex or interposer 1014. In still further cases, such as shown in FIG. 10D, a drive/sense chip 1016 can be coupled via an interposer or a flex 1020 to any suitable element within the display stack, identified as the display stack layer 1018. In these examples, the acoustic imaging system can integrate within the display of the electronic device.

The foregoing description of the embodiments depicted in FIGS. 10A-10D, and various alternatives and variations, are presented, generally, for purposes of explanation, and to facilitate a thorough understanding of various techniques that may be employed to couple a group of acoustic transducers to a drive circuit and/or a read circuit that may be integrated with or otherwise associated with a display (or a display stack layer) of an electronic device and, separately or additionally, various techniques that may be employed to couple an acoustic transducer to an imaging surface. However, it will be apparent to one skilled in the art that some of the specific details presented herein may not be required in order to practice a particular described embodiment, or an equivalent thereof.

Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 11:
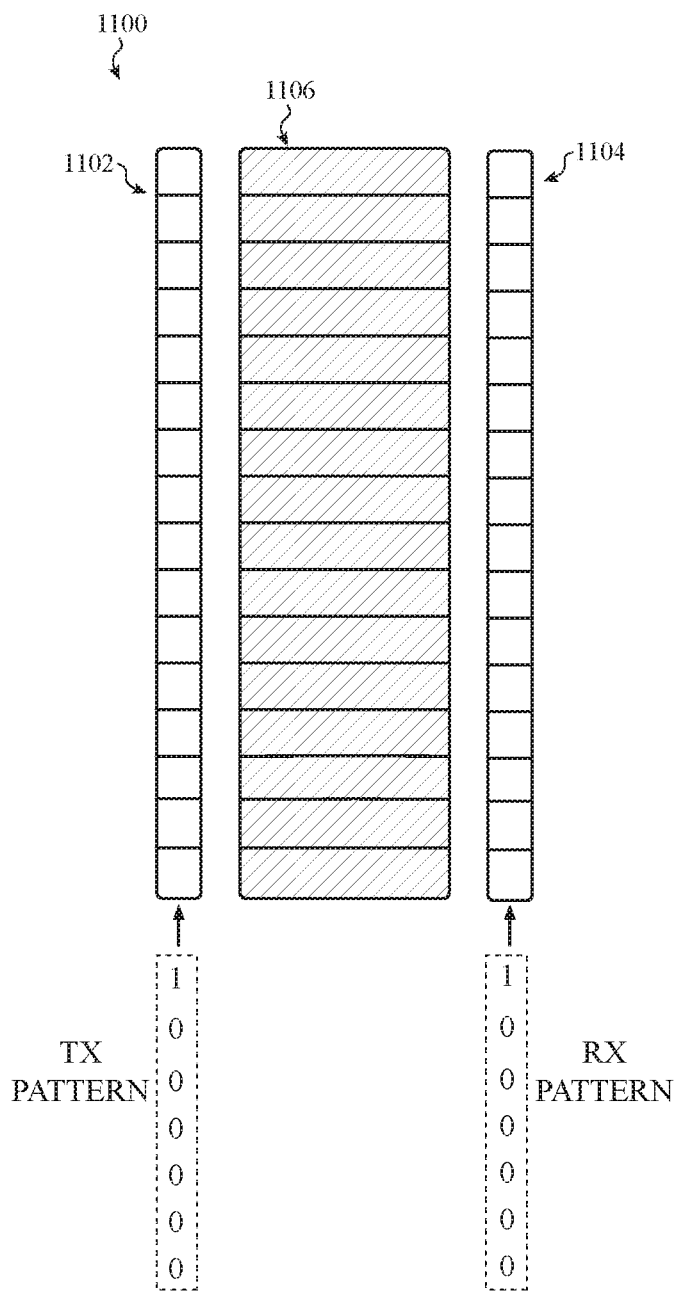
FIG. 11 depicts a shift register topology that can be used to drive more than one acoustic transducer substantially simultaneously.

FIG. 11 depicts a shift register topology that can be used to drive more than one acoustic transducer substantially simultaneously. More specifically, an acoustic imaging system 1100 can include a drive register 1102 and a read register 1106 that are each associated with a line of adjacent transducers, identified as the transducer array 1106. In this example, the drive register 1102 and the read register 1106 can be implemented in any suitable manner; in one embodiment, both registers are implemented as a series of flip-flops sharing a single clock signal. In other cases, the drive register 1102 and the read register 1106 can be implemented in another manner. In many cases, the drive register 1102 and the read register 1106 can be implemented in the same silicon packaging (e.g., integrated circuit) as a display driver or touch controller of a touch-sensitive display of an electronic device that accommodates the acoustic imaging system 1100.

The drive register 1102 receives a serial transmit-enable signal (identified as the TX pattern) and the read register 1004 receives a serial read-enable signal (identified as the RX pattern). Once the registers are filled, a drive operation or a read operation can be performed by a controller associated with the acoustic imaging system.

Figure 12:
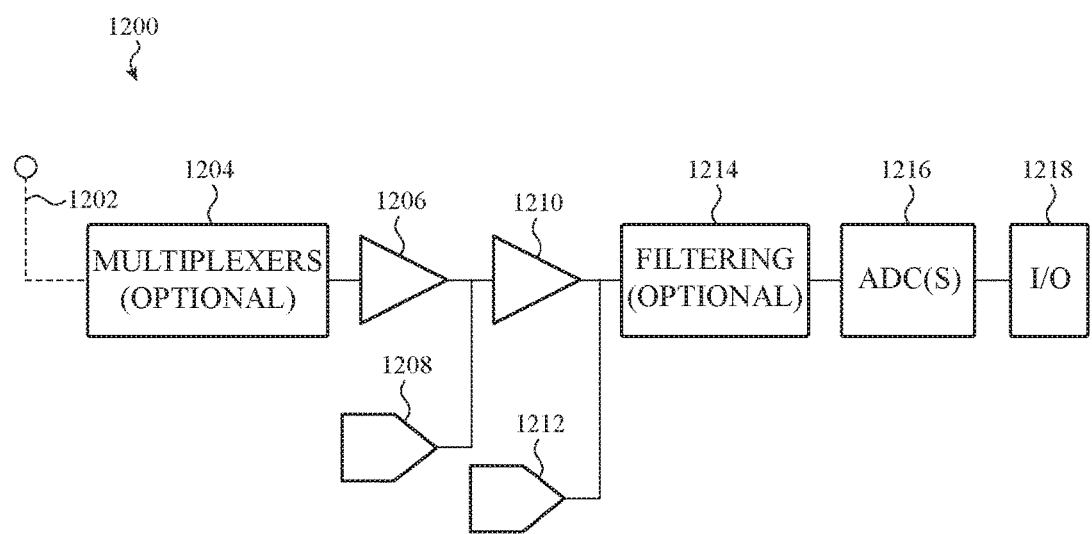
FIG. 12 is a simplified system diagram of a sense chip that can be used with one or more acoustic imaging systems such as described herein.

A controller for such a system, described above with reference to FIG. 2, can be implemented in a number of ways. For example, FIG. 12 is a simplified system diagram of a sense-mode portion of a controller (e.g., sense chip) that can be used with one or more acoustic imaging systems such as described herein. In some cases, the sense-mode portion of a controller is referred to as an "analog front end."

FIG. 12 depicts one example analog front end, identified as the analog front end 1200. As with the registers depicted in FIG. 11, the analog front end 1200 can be partially or entirely implemented in the same silicon packaging as a display driver or input driver/controller of a touch and/or force-sensitive display of an electronic device.

The analog front end 1200 can include multiple stages, modules, and/or interconnected operational circuit components, some of which are shown in the illustrated example.

The analog front end 1200 receives an input 1202 from one or more acoustic transducers. The input 1202 is typically pre-amplified by a thin-film transistor circuit disposed and/or implemented in close physical proximity to an acoustic transducer. In other cases, the pre-amplifier can be implemented in another way.

The analog front end 1200 can optically receive the input 1202 at one or more multiplexers 1204 configured to direct signals received from particular acoustic transducers to particular processing modules or circuit components. In other cases, the one or more multiplexers 1204 may not be required.

The analog front end 1200 can include a gain and offset correction block that can be implemented with one or more amplification stages, each associated with one or more analog-to-digital converters. In the illustrated embodiment, two amplifiers are identified, each associated with one or more digital-to-analog converters configured to correct gain and/or offset in the signals output from the amplifiers. More specifically, the amplifier 1206 is associated with a digital-to-analog converter 1208 (to adjust gain and/or offset) and the amplifier 1210 is associated with a digital-to-analog converter 1212 (to adjust gain and/or offset). The output from the amplifiers and converters can be optionally received by a filtering module, identified as the filter 1214. After filtering, the amplified and filtered analog signal can be converted to digital by an analog-to-digital converter 1216. Thereafter, the digital signal is received at an input port 1218 of a processing module that may be associated with an image resolver such as described herein.

The foregoing description of the embodiments depicted in FIGS. 11 and 12, and various alternatives and variations, are presented, generally, for purposes of explanation, and to facilitate a thorough understanding of various techniques for driving and reading one or more acoustic transducers of an acoustic imaging system. However, it will be apparent to one skilled in the art that some of the specific details presented herein may not be required in order to practice a particular described embodiment, or an equivalent thereof.

Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 13:
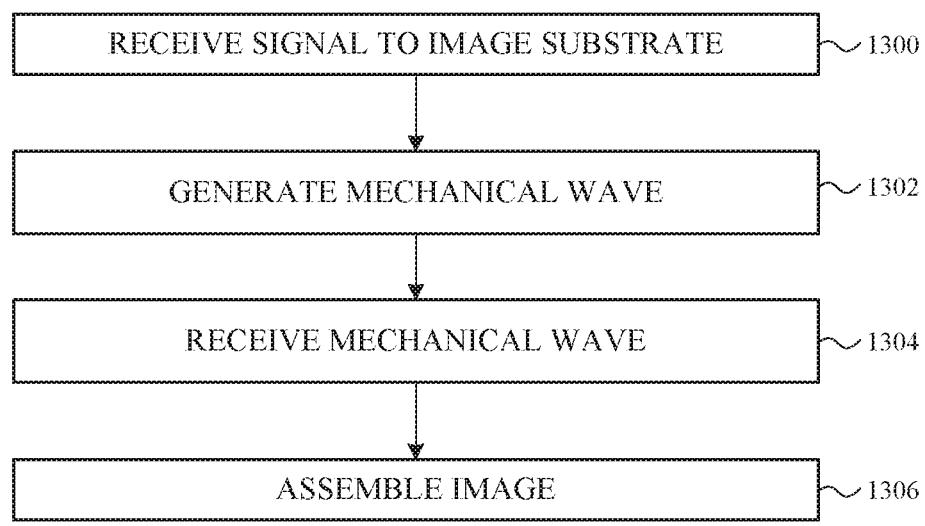
FIG. 13 is a flow chart that corresponds to a method of operating an acoustic imaging system.

FIG. 13 depicts example operations of a simplified method of operating an acoustic imaging system of an electronic device. The method begins at operation 1300 in which an acoustic imaging system receives a signal (e.g., from an electronic device processor) to assemble an image of an imaging surface to which the acoustic imaging system is coupled. At operation 1302, a mechanical wave is generated within the imaging surface. Next, at operation 1304, a mechanical wave is received. Finally, at operation 1304, data associated with the mechanical wave received at operation 1304 is used to generate an image of an object in physical contact with the imaging surface.

In some cases, the image may be used as touch input to an electronic device. In other cases, the image may be used to authenticate a function, operation or task of the electronic device. In still further cases, the image may be used to determine an amount of force applied to the electronic device.

Figure 14:
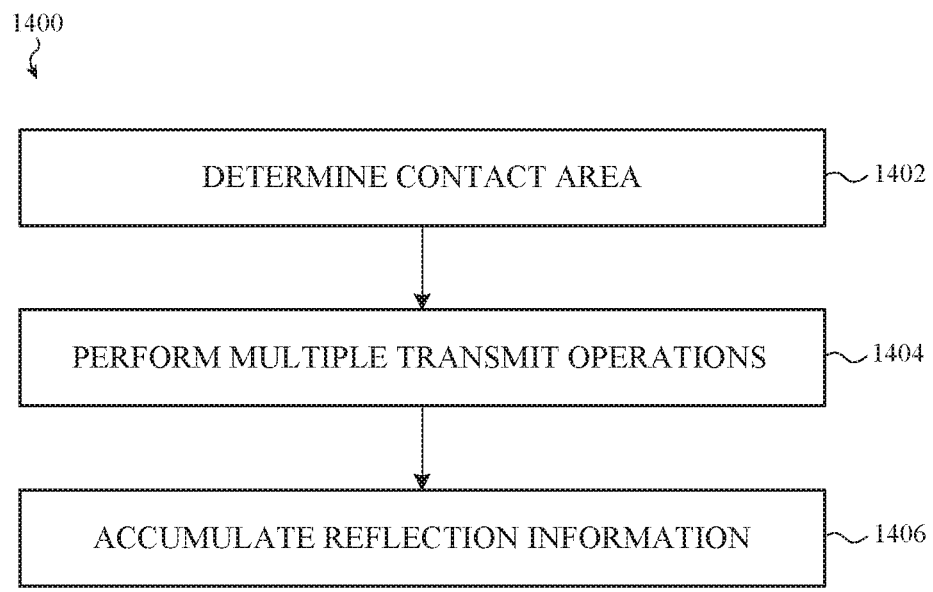
FIG. 14 is a flow chart that corresponds to another method of operating an acoustic imaging system.

FIG. 14 depicts example operations of a method of operating an acoustic imaging system that is coupled to a user input surface. The method depicted can be performed by the acoustic imaging system 200 of FIG. 2. The method 1400 begins at operation 1402 in which a contact area is determined. The contact area is the area over which an object, such as the finger of a user, physically contacts an outer surface of the user input surface. In many embodiments, the contact area is determined by a contact sensor (e.g., touch sensor). Next, at operation 1404, multiple transmitting operations are performed. The transmitting operations can be associated with a single acoustic transducer or multiple acoustic transducers. The transmitting operations can be single-pulse or multi-pulse transmitting operations. The transmitting operations can be coded or non-coded. The transmitting operations may be spatially coded. Next, at operation 1406, reflection information associated with each transmitting operation may be accumulated.

Figure 15:
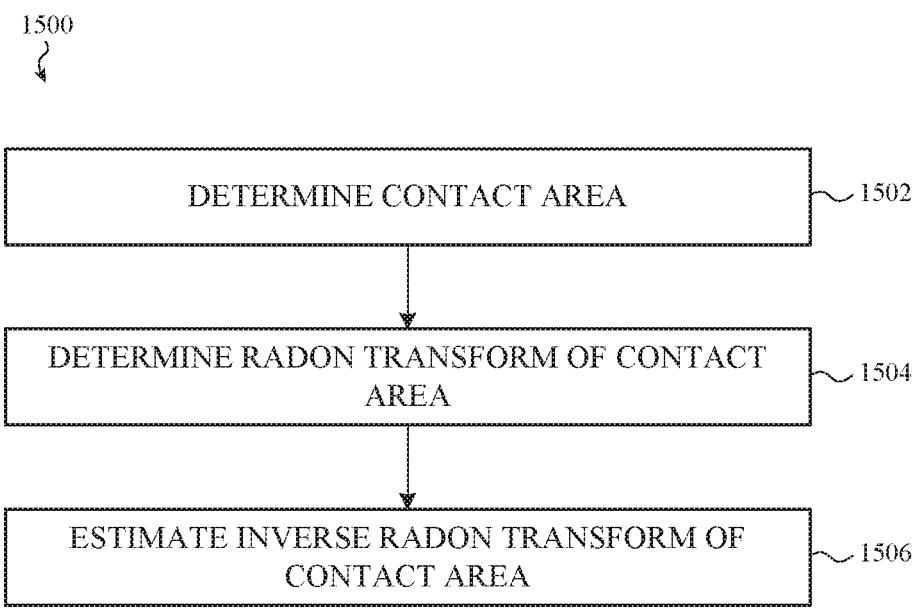
FIG. 15 depicts example operations of another method of operating an acoustic imaging system.

FIG. 15 depicts example operations of a method of operating a tomographic acoustic imaging system that is coupled to a user input surface. The method depicted can be performed by the tomographic acoustic imaging system 200 of FIG. 2. The method 1500 begins at operation 1502 in which a contact area is determined. The contact area is the area over which an object, such as the finger of a user, physically contacts an outer surface of the user input surface. In many embodiments, the contact area is determined by a contact sensor (e.g., touch sensor). Next, at operation 1504, the Radon transform of the contact area is determined. Typically, as noted above, the Radon transform is determined by performing a number of parallel projections of the contact area at a variety of angles around the contact area. Finally at operation 1506, an estimate of the inverse Radon transform may be estimated. In one embodiment, the inverse of the Radon transform may be estimated by performing a filtered back projection of the various planar projections obtained at operation 1504.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order or fewer or additional steps may be required or desired for particular embodiments.

For example, although many embodiments are described herein with reference to systems and methods for generating an image of a user's fingerprint, these systems and methods can alternatively or additionally be used to perform other operations, or to obtain non-fingerprint information, such as, but not limited to: generating an image of a palm; generating an image of an ear, face, or cheek; determining the location of a stylus on an input surface of an electronic device; determining a physiological characteristic of a user such as heart rate, respiration rate, blood oxygenation, and so on; determining characteristics of a non-input surface; determining the force with which a user touches an input surface; determining the location at which a user touches an input surface; and so on. Accordingly, it may be appreciated that the various systems and methods presented below are merely examples and that other embodiments, systems, methods, techniques, apparatuses, and combinations thereof are contemplated in view of the disclosure provided above.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, which benefit the user, are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An electronic device comprising:
   an outer cover defining a user input surface for receiving a touch input from a user;
   an array of acoustic transducers in communication with the user input surface positioned relative to a periphery of the user input surface;
   a controller in communication with each acoustic transducer of the array of acoustic transducers and configured to:
   apply a coded impulse signal to at least one acoustic transducer of the array of acoustic transducers, in response to the touch input, to cause the at least one acoustic transducer to propagate a coded acoustic output into the outer cover and toward the user input surface; and
   receive reflection information obtained using the at least one acoustic transducer, the reflection information corresponding to one or more acoustic reflections associated with the touch input; and
   an image resolver in communication with the controller and configured to receive the reflection information and, in response, generate an image corresponding to the touch input.

2. The electronic device of claim 1, wherein the two-dimensional image of the touch input corresponds to a fingerprint of the user.

3. The electronic device of claim 1, wherein the at least one acoustic transducer is tuned to resonate at a predefined frequency.

4. The electronic device of claim 3, wherein the selected frequency is approximately equal to 5 MHz.

5. The electronic device of claim 1, wherein the coded impulse signal comprises at least two voltage impulse signals of alternating polarity.

6. The electronic device of claim 1, wherein the array of acoustic transducers is positioned relative to an edge of a display positioned below the user input surface.

7. The electronic device of claim 6, wherein:
   a first portion of the array of acoustic transducers is positioned relative to a top edge of the display; and
   a second portion of the array of acoustic transducers is positioned relative to a bottom edge of the display.

8. The electronic device of claim 6, wherein the array of acoustic transducers extends around a perimeter of the display.

9. An acoustic imaging system comprising:
   an outer cover defining a user input surface for receiving touch input from a user;
   an acoustic transducer disposed on a surface of the outer cover beyond a perimeter of the user input surface, the acoustic transducer tuned to resonate at a predefined frequency; and
   a controller in communication with the acoustic transducer and configured to apply an impulse voltage signal to the acoustic transducer to induce a resonant mode in the acoustic transducer, thereby causing the acoustic transducer to resonate at the predefined frequency and generate an acoustic output that propagates through the outer cover at the predefined frequency, parallel to the surface, at least partially toward the user input surface.

10. The acoustic imaging system of claim 9, wherein the acoustic transducer is an ultrasonic transducer.

11. The acoustic imaging system of claim 9, wherein the acoustic transducer is formed from a piezoelectric material.

12. The acoustic imaging system of claim 9, wherein the acoustic transducer is a member of a group of acoustic transducer disposed beyond the perimeter of the user input surface and relative to a periphery of a rectangular subarea of the user input surface.

13. The acoustic imaging system of claim 9, wherein the controller is configured to apply a coded series of impulse voltage signals to the acoustic transducer.

14. The acoustic imaging system of claim 13, wherein in response to the coded series of impulse voltage signals, the acoustic transducer is configured to output a coded series of acoustic outputs.

15. The acoustic imaging system of claim 9, further comprising a touch sensor coupled to the user input surface.

16. A method of operating an acoustic imaging system comprising:
   determining a contact area of a user input surface corresponding to a location of a user touch;
   applying a coded impulse signal to an acoustic transducer coupled to the user input surface to propagate a coded acoustic output into the user input surface toward the contact area;
   receiving reflection information corresponding to the coded acoustic output; and
   generating an image of the contact area based on the reflection information.

17. The method of claim 16, further comprising applying two or more voltage impulse signals of alternating polarity in a sequence.

18. The method of claim 16, wherein the two-dimensional image of the contact area corresponds to an image of a fingerprint.

19. The method of claim 16, wherein the coded acoustic output comprises two or more acoustic pulses.

* * * * *